July 21, 1959  A. D. LACKEY  2,895,583
COIN-OPERATED VENDING MACHINES
Filed Jan. 21, 1954  14 Sheets-Sheet 1

Inventor.
Alan D. Lackey
BY Ward, Neal, Haselton, Orme & McElhannon
Attorneys.

July 21, 1959    A. D. LACKEY    2,895,583
COIN-OPERATED VENDING MACHINES
Filed Jan. 21, 1954    14 Sheets-Sheet 2

Inventor
Alan D. Lackey
BY
Ward, Neal, Hamilton, Orme & McElhannon
Attorneys

Inventor.
Alan D. Lackey.

Inventor
Alan D. Lackey

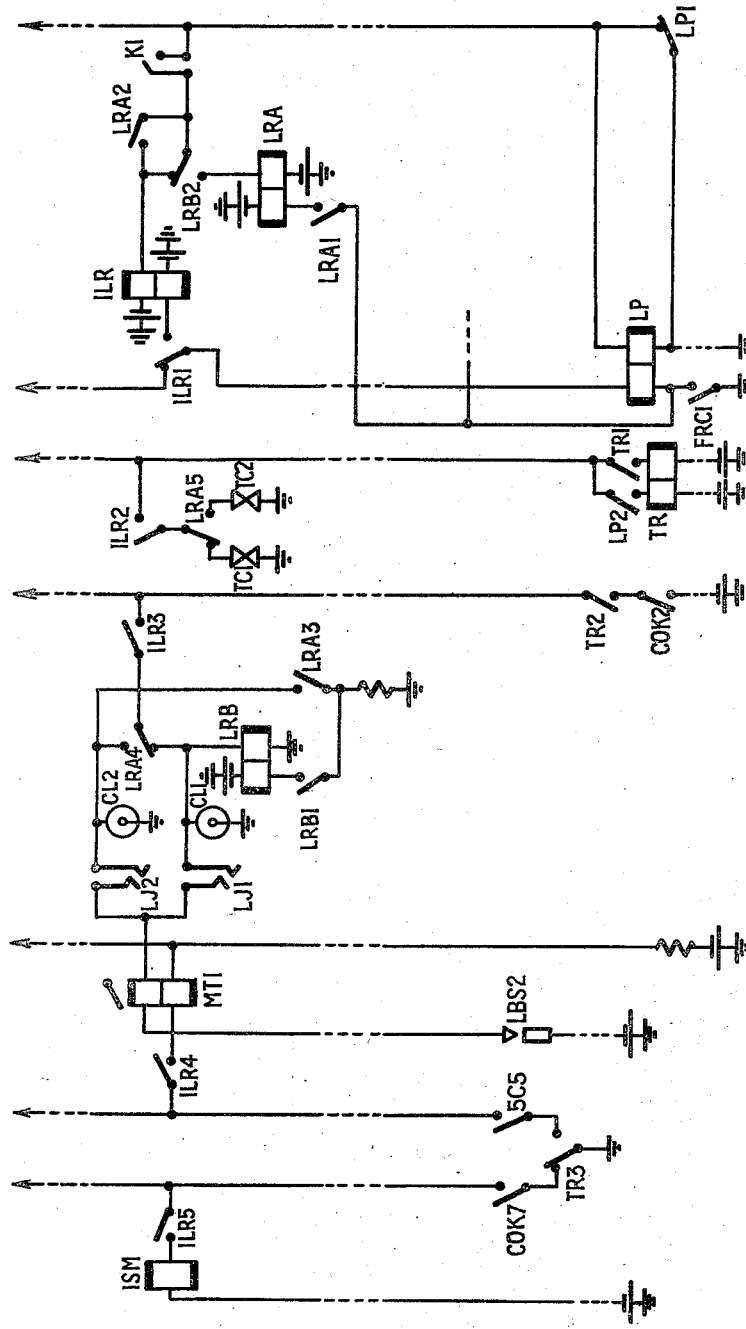

July 21, 1959    A. D. LACKEY    2,895,583
COIN-OPERATED VENDING MACHINES
Filed Jan. 21, 1954    14 Sheets-Sheet 12

| FIG. | | | FIG. |
|---|---|---|---|
| 4 | 5DA | | |
| 4 | MRA | | |
| 5 | PSA | 5D | 4 |
| 4 | PD | 4D | 4 |
| | | 6D | 4 |
| 9 | SUD | 3D | 4 |
| 7 | ODA | 2D | 4 |
| 4 | OD | 1D | 4 |

"D"

| FIG. | | | FIG. |
|---|---|---|---|
| 5 | MRB | | |
| 5 | PS | | |
| | | 4S | 5 |
| 9 | SUS | 3S | 5 |
| 7 | OSA | 2S | 5 |
| 5 | OS | 1S | 5 |

"S"

| FIG. | | | FIG. |
|---|---|---|---|
| 6 | MRC | | |
| 5 | LS | 5F | 6 |
| 6 | PF | 4F | 6 |
| | | | |
| 9 | SUF | 3F | 6 |
| | | 2F | 6 |
| | | 1F | 6 |

"F"

| FIG. | | | FIG. |
|---|---|---|---|
| 7 | PCH | STA | 9 |
| 10 | PCA | STB | 8 |
| 10 | PC | DB | 8 |
| 10 | 5C | HDD | 1 |
| 10 | 4C | SB | 8 |
| 10 | 3C | HDS | 2 |
| 10 | 2C | FB | 8 |
| 10 | 1C | HDF | 3 |

"M"

| FIG. | | | FIG. |
|---|---|---|---|
| 10 | LP | TR | 10 |
| 1 | COK | CXR | 1 |
| 9 | FRA | FRB | 7 |
| 9 | FRC | MR | 1 |
| 12 | LRB | LRA | 12 |
| 9 | SUB | RR | 9 |
| 9 | AS | CHP | 9 |
| 8 | CHD | CHS | 8 |

"C"

| FIG. | | | FIG. |
|---|---|---|---|
| 10 | 1LR | 2LR | 10 |
| 10 | 3LR | 4LR | 10 |
| 10 | 5LR | 6LR | 10 |
| 10 | 7LR | 8LR | 10 |
| 10 | 1SM | 2SM | 10 |
| 10 | 3SM | 4SM | 10 |
| 10 | 5SM | 6SM | 10 |
| 10 | 7SM | 8SM | 10 |

"LINE RELAYS"

*Fig. 13.*

Inventor
Alan D. Lackey
BY Ward, Neal, Haselton, Orme & McElhannon
Attorneys.

July 21, 1959 A. D. LACKEY 2,895,583
COIN-OPERATED VENDING MACHINES
Filed Jan. 21, 1954 14 Sheets-Sheet 13

Inventor
Alan D. Lackey
by Ward, Neal, Haselton, Orme & McElhannon
Attorneys

United States Patent Office 2,895,583
Patented July 21, 1959

2,895,583
COIN-OPERATED VENDING MACHINES

Alan D. Lackey, McMahon's Point, New South Wales, Australia, assignor to T. S. Skillman and Company Pty. Limited, Cammeray, near Sydney, Australia, a corporation of New South Wales Application January 21, 1954, Serial No. 405,431

Claims priority, application Australia January 23, 1953

11 Claims. (Cl. 194—10)

The invention relates to customer operated vending machines and more particularly to vending machines selling a wide range of articles of different character with only one payment representing the value of a plurality of selected articles.

A vending machine has been proposed in which a customer establishes a credit by tendering or inserting a certain amount in coins of various denominations. Upon the subsequent selection of articles this credit is reduced either to zero or, if provisions are made, the rest of the credit can be returned to the customer in the form of change.

These known machines use for the reducing of credit an adding process by which the complement of the amounts to be deducted is added so that for each operation the credit registering mechanism has to complete a full cycle before it is possible to select the next article. Furthermore any fault developing in the corresponding circuits brings the whole apparatus to a standstill. Furthermore no automatic coin return was provided if, for example, the selected article was out of stock, or the initial established credit was too low, to buy the selected article. Such a machine is, for example, described in U.S. patent specification No. 2,708,996 by T. S. Skillman, issued May 24, 1955.

The apparatus according to the invention overcomes these and other disadvantages of the known machine.

In one form of the invention the credit checking is divided into two checking operations. In one case when the credit is higher than the value of the selected article the subtracting cycle is started to reduce the credit; in case, however, the credit is exactly right the subtracting cycle is eliminated and the credit registering means are directly returned to zero.

Furthermore, all the operations can be performed by relay circuits so that a direct subtraction can be carried out. For credit registering the relays are operated in sequence and for credit reduction they are released in opposite sequence, thus shortening the time necessary to complete the reduction in credit.

In another form of the invention the various relays necessary for the credit registration in different denominations are arranged as relay units which are exchangeable by means of plug and socket connections, so that they can be exchanged in such a way that in the case of failure at least restricted working is possible as will be described later in detail.

A further form of the invention deals with an automatic coin refund, when, for example, the first selected article is out of stock, or the line is out of order, or, when the initial credit was too low, or the customer inserts coins of a total value exceeding the capacity of the machine.

These and other forms of the invention will appear more clearly from the following description in connection with the drawings in which:

Fig. 12 shows a modification of Fig. 10 for "multiple bin" working;

Fig. 13 shows schematically the position of the relays in the individual relay boxes and where they can be found in the circuit diagram.

Figure 15:
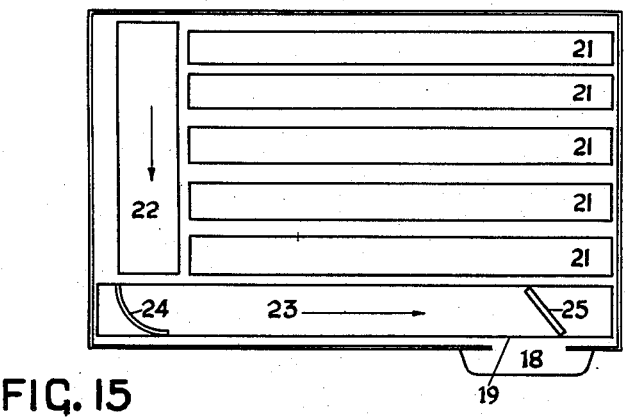
Figure 16A:
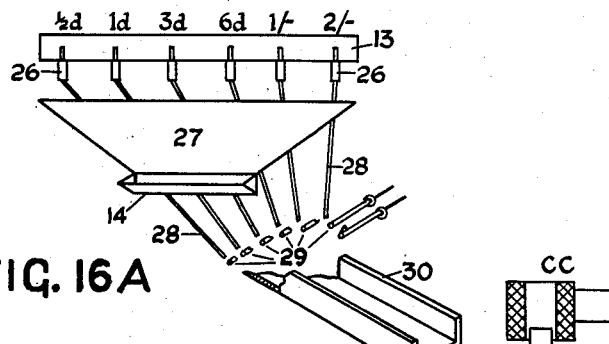
Figure 16B:
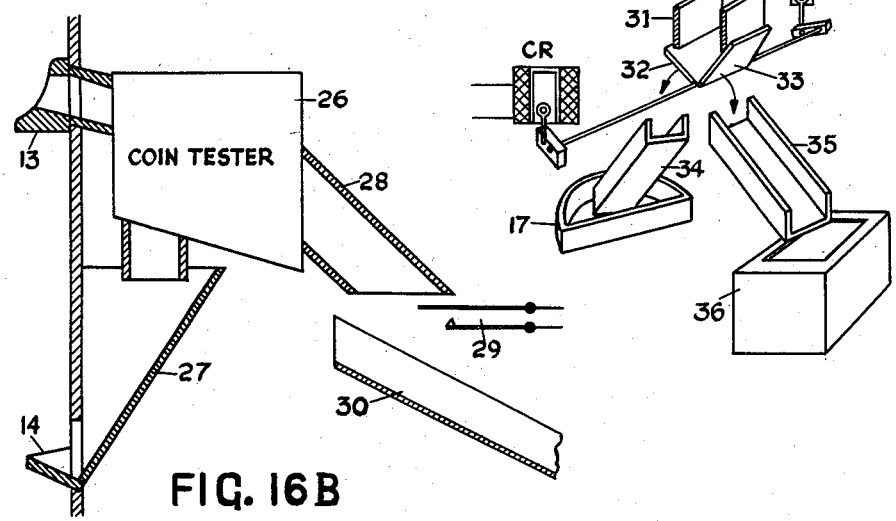

Fig. 15 gives by way of example a plan view of the interior of a vending machine incorporating the invention;

Figs. 16A and 16B show schematically a suggested arrangement for the insertion, rejection, acceptance and refund of coins.

Figure 14:
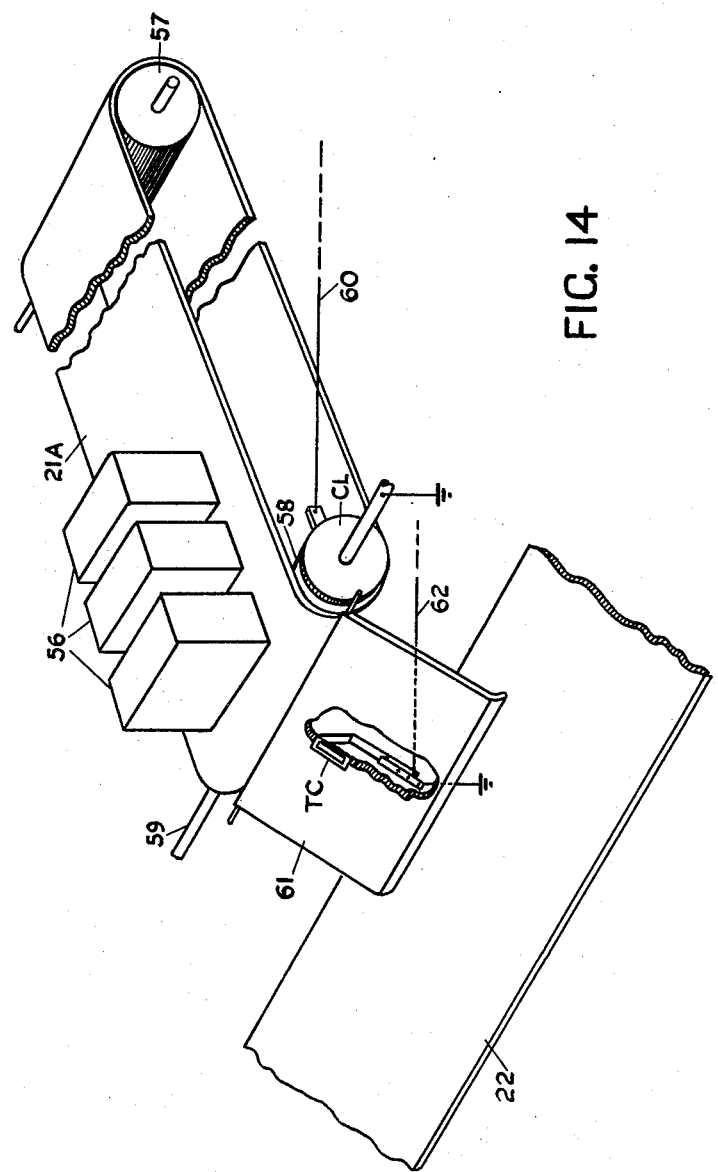
Fig. 14 shows schematically a storage and releasing device in which articles are stored on a movable belt.

For the embodiment shown it is assumed that the vending machine is of the type in which articles of various characters are stored on horizontal conveyor belts and are released therefrom by the operation of individual electrically operated clutches which connect the corresponding belt pulleys with a driving motor, and which are disengaged by a trip switch arranged in the path of a released article and temporarily actuated thereby. Such an arrangement is, for example, shown in Fig. 13 of the abovementioned U.S. Patent 2,708,996 by T. S. Skillman and is described hereinafter with reference to Fig. 14. A horizontally arranged storage belt 21A carries articles 56 for dispensing. The belt 21A passes around rollers 57 and 58, the latter being connectable over an electromagnetic clutch CL with a constantly running power driven shaft 59. When the clutch CL is energized over wire 60, as described in detail later on, the belt 21A moves until the foremost article 56 topples over, slides over a flap or guide 61 and operates temporarily the trip-contact TC which by means of the electric circuit 62 releases the clutch CL as will appear later and stops further movement of belt 21A. Released articles fall onto the conveyor belt 22. The articles are then transported by a suitable take-off arrangement to a delivery position, where the customer can pick them up.

Fig. 15 shows the plan view of the interior of a vending machine which can be used with the invention. The articles are stored on storage belts 21 arranged side by side and of the same structure as described above in connection with Fig. 14. Released articles fall onto the conveyor belt 22 from which they are transferred by way of converter 24 to a second conveyor belt 23. A second converter 25 shifts the articles through opening 19 to the delivery position 18.

Coins inserted in appropriate coin slots are held temporarily in an intermediate position, for example a coin tray, and are released by electromagnetic means into a coin box, after the first article has been selected, or are returned to the customer in certain circumstances, as will appear later on.

Figure 3:
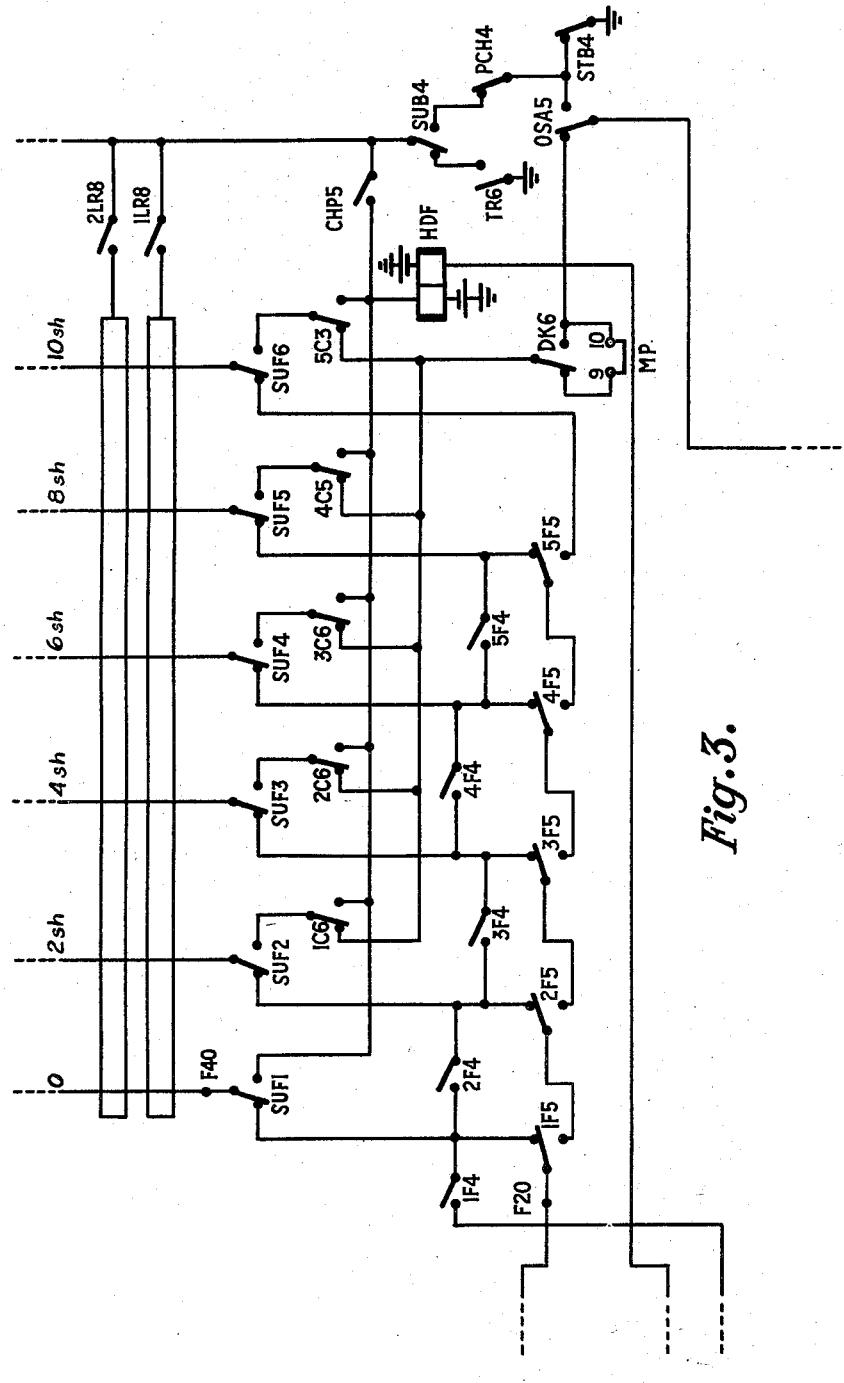

An arrangement which can be used for this purpose is, for example, shown in Fig. 3A of the abovementioned U.S. Patent No. 2,708,996.

Such an arrangement is described hereinafter in connection with Figs. 16A and 16B. Coins inserted into the appropriate slots in the coin panel 13 are tested by coin testers 26 of any well known structure, one coin tester being provided for each denomination of coin. Rejected coins drop into the chute 27 and thence into the rejected tray 14. Coins which are passed by the coin testers are guided down channels 28 to a common chute 30, whence they slide into the coin holding receptacle 31. On its movement each coin strikes the arm of a micro-switch 29 associated with the respective channel to record the tendering of the coin and credit the customer as will be shown later on.

The bottom of the coin holding receptacle 31 is formed by two flaps 32 and 33 which when opened release the coins either over chute 34 into the coin return tray 17 or over chute 35 into the coin collecting box 36. Flap 32 is held in the closed position by a normally energized solenoid CR while flap 33 can be opened by the operation of the solenoid CC. Details of the circuits of these solenoids will be given later on.

The values of the stored articles are recorded on a so-called pricing frame in which, for each denomination in the price of an article, a horizontal bar crosses vertical bars corresponding to each value in said denomination, and in which electrical connections are made at the crossing point of the horizontal bar with the vertical bar of the particular value for the corresponding article. Such a structure is, for example, shown in U.S. Patent No. 1,773,421 by J. W. Bryce. The electrical connections between these bars and the other parts of the circuits can be seen in the circuit diagram and are described later on in detail.

Before a detailed description of the circuits is given, the functions of the new vending machine will be described briefly together with the function of the circuits and relays.

The control gear of the new vending machine consists mainly of exchangeable relay boxes of the type used in telephone equipment as shown, for example, on page 301, Fig. 439, in the book "Telephony" vol. 1 by J. Atkinson, 1948, and the pricing frame which is permanently connected into the vending machine. The number of relay boxes depends on the number of lines or different kinds of articles to be provided, as in the example given eight line relays are combined in one relay box. The relay boxes for the other relays remain the same irrespective of how many lines are equipped in the machine.

Coins inserted into the machine are counted by circuits in three of the relay boxes and when articles are purchased, the price of each article is deducted and the remaining credit may be spent on other articles or taken out in change.

Provision of a change-maker is optional but the circuits provide for a coin return device, which can return any coins that have been inserted if the article selected is unavailable for any reason.

While prior vending machines made use of bin-empty lamps with switches and weights behind the articles, the vending machine according to the invention uses an automatic bin-empty indicator which is operated from the control gear if a selected article is not delivered by the machine. As in the embodiment described hereafter articles are stored on a belt driven by a clutch device, a time delay is provided to permit the belt to run for a suitable distance, after which the clutch is released; but a further short delay elapses before the circuits are cleared in case the article should topple off the belt just as the clutch is released. After this further delay, the bin-empty indicator is operated and the circuits are restored.

The bin empty indicator has two windings, one for operation and one for restoring and can, for example, take the form of the indicator shown in Fig. 163 on page 120 of the above-mentioned book "Telephony," having a movable shutter or flag to indicate that an article is out of stock. The indicator is automatically restored when the loading jack is used to re-load the line, as described later on.

Provision is made for a coin return device to return inserted coins to the customer automatically when the line is found to be out of stock, but this can only be effective if the article is the first article of a transmission, since if other articles had been purchased this money would have been collected by the machine.

The coin return device is equipped with two solenoids, one of which is normally operated, and in this position the device retains coins which are inserted. This solenoid is released by a power failure or if a selected line is out of stock, as described above, or if a credit is insufficient to buy a selected article; if the trip switch of the selected line normally opened momentarily by each released article, remains open; or by pressing the "coin return and change" button. The second solenoid is used for collecting the coins into the machine when an article has been sold.

Provision to subtract the price of articles sold (so that a credit may be established and several articles then purchased) means that the relays must make a large number of operations to effect this subtraction. In many cases it has been found that customers put in the exact money for one article and buy only that one article. It is then unnecessary to perform this complicated subtracting operation as it is only necessary to release the credit relays to zero. Provision has, therefore, been made to distinguish the cases where the credit in the machine is exactly right for the selected article. The subtraction cycle is then cut out and the adding relays released in one simple operation. To ascertain the total value of goods sold, meters are connected to operate during the subtracting cycle and to count the number of operations given by the subtracting equipment. This can only be satisfactory if all articles sold effect the subtracting cycle; as where the subtracting cycle is cut out, as mentioned above, false readings will be given. Therefore, cash meters are not fitted permanently to the machine, but a meter plug is provided into which a set of cash meters can be plugged. By plugging in these meters in place of a normal dummy plug, the subtracting cut-out facility is eliminated and all articles effect the subtraction cycle whether credit is exactly right or not In this way cash meters can be operated but the machine must do a certain amount of extra work when this facility is provided Since the number of relay operations involved in the processes of subtracting or change-giving is very great compared with the operations involved in the other operations of the machine, it is likely that failures will occur most often during these operations. A failure during the subtracting or change-giving will almost certainly result in the subtracting relays remaining operated so a lamp has been provided which normally lights only for a few seconds during subtracting or change-giving. If this light is found to be lit continuously it indicates that a fault has occurred, and by removing the normal dummy plug from the meter socket and replacing it with a "restricted working" plug, the machine may be used despite the existence of a fault for selling articles when the credit is exactly equal to the price.

In the embodiment described hereafter the circuits provide for a maximum credit of 11/11d., and for the price of any article to be also 11/11d., both rising in steps of 1d.

The machine is intended to operate from 1d., 6d., and 2/-d. but 1/-d. can be used if each coin is made to operate two contacts in succession.

Provision is made for money inserted to be automatically returned to the customer if he should attempt to insert more than the maximum credit of 11/11d.

Three relay boxes are provided to cover the counting of the money, one, the "D" box, counts in pennies up to 6d., the next, the "S" box, counts in sixpence up to 2/-d. and the third, the "F" box, counts the florins up to 10/-d.

The pricing frame is similarly split into three sections so that the price of, say 2/8d. would require electrical connections between the horizontal and vertical bars in positions representing 2/-d., 6d. and 2d. The three counting boxes are all different, and therefore, they are not completely inter-changeable. However, the "D" box which counts the pennies has been so arranged that it can be used in any position and replace either the "S" or "F" boxes. The maintenance man need not carry any "S" or "F" boxes with him but if he finds a fault in one of these boxes in a machine, he may replace it with a spare "D" box and in fact there is no reason why machines should not be operated with three "D" boxes in the three counting positions, except that the "D" box is more expensive than either the "S" or "F" boxes.

It should be noted that substitution of a spare "D" box in place of a faulty "S" or "F" box provides normal working in all respects and is quite distinct from any of the facilities which provide only for restricted working of the machine.

Cases may occur where a machine develops a fault in one of its counting boxes and no spare box is immediately available. If this occurs, restricted working can be obtained by removing the faulty box and re-arranging the two remaining boxes and inserting a dummy plug. Irrespective of which box is faulty, the two remaining boxes may be used to give restricted working in either of two price ranges—selling articles priced in steps of 1d. to a maximum of 1/11d. or alternatively selling articles priced in steps of 6d. up to a maximum of 11/6d. In some cases the subtracting feature is retained, but in other cases the credit inserted must be exactly equal to the price. Details of the restricted facilities available with only two serviceable counting boxes will be found in the following detailed description.

Provision has been made for the control of two motors in this equipment, both motors starting simultaneously when an article is to be delivered—one which drives the clutches and stops immediately the clutch is released in order to reduce the wear on the clutches to a minimum; while the second motor is for driving the take-off and this motor runs for several seconds after an article has been delivered.

A meter is provided to record the number of articles sold by the machine and individual sales meters may be provided to record individual sales on the individual lines.

Meters which can be used for this purpose are, for example, shown in the above-mentioned book "Telephony" in Figs. 167 and 168 on page 123.

Provision is made in the circuit for the operation of a change-maker which returns change in pennies and sixpences.

Such a change-maker can, for example, be similar to the device shown in U.S. Patent No. 1,961,537. No alterations to the circuit are necessary if the change-maker is not fitted. A button is provided to be pressed to obtain change; this is the same button that is used when the customer desires his coins to be returned. When the button is pressed the machine determines whether a customer's coins are still available to him, and if so, returns them; but if an article has been purchased and the coins collected, then the machine will return him change to the value of the credit in the machine. This feature prevents people from inserting money into the machine and using it only as a change-maker. The change-maker has two solenoids, one of which ejects pennies and the other one sixpences each time they are operated, and switches are provided to indicate when the change tubes are empty. These switches have been arranged in the circuit so that their contacts may also be used for lighting a "Change Empty" lamp.

The schematic circuit diagram is drawn on the usual detached contact principle.

Fig. 13 shows the arrangement of the various relays in the individual relay boxes. Relay box "D" contains the relays 1D to 5D for registering pennies up to fivepence, the relay 6D to carry over any sixpences into the next denomination, a relay 5DA which operates together with relay 5D to make additional contacts available, a pilot relay PD to "steer" the various battery pulses, a zero penny relay OD used only during the subtracting cycle and operating together with relay ODA to carry a 6d. down from the next higher denomination if the reduced credit in the penny denomination passes through zero. Relay SUD is operating during the subtracting and change-making cycles to switch over the vertical bars of the pence section from the credit checking circuits to the subtracting circuits. Relay PSA is used for switching the lamp circuits whenever an odd number of 6d. are recorded by the 6d. credit relays. The rectifier MRA prevents sneak circuits, which could prevent the release of relay PD at the correct time.

The functions of the contacts of the various relays will appear later on in connection with the detailed circuit description.

The "S" box has less relays than the "D" box as it registers only 6d. up to two shillings (one florin) by relays 1S to 4S, the latter relay being used to transfer the florin value into the next group. The relays OS, OSA, SUS and PS fulfill the same functions for 6d. values as the corresponding relays in the "D" box.

The "F" box is similar again. Relays 1F to 5F are used for registering up to five florins. No carry over relay is required as the florin is the highest denomination for which the machine is equipped. Relays SUF and PF correspond to similar relays in the "D" and "S" boxes, while relay LS controls the operation of the florin lamp. This latter relay is controlled from the 2S relay in the "S" box.

The further relay boxes "M" and "C" contain further relays to fulfill the various functions of the machine given above. In the "M" box the relays 1C to 5C form a counting train to count the number of operations during a subtracting cycle and to terminate that cycle at the right time. They are also used as time delay devices to control the running of a line belt when an article is out of stock and the running time of the take-off motor. Relays PC and PCA are pilot relays to "steer" the operating pulses to the next un-operated relay in the train. Relay PCH holds up the pence counting operation during carrying-down periods and in addition removes the deducting earths from the credit relays at appropriate times. Relays STA and STB form a time delay circuit and are primarily used together with relay PCH to control the stepping of the relays during the subtracting and change-making cycles. They inhibit the pilot relays PD, PS and PF from operation while a deduction is in progress. Relays HDD, HDS and HDF are used to hold the deduction in the corresponding denomination when no further deduction in this denomination is required during the subtracting cycle, and permit the deduction in other denominations to proceed. Relays DB, SB and FB are normally operated and their release gives an indication that all circuits in the credit relay boxes have been broken by the release of the last operated credit relay during the subtracting cycle. These relays are slow to release to ensure that the credit relays have time to release fully, and also help to slow down the change-making cycle so that the change-making solenoids have ample time to operate.

The "C" relay box contains the line pilot relay LP which operates together with any of the line relays to control the circuits established at an article selection. The relay depending on the operating of the article operated trip contact is relay TR, which also detects whether the trip contact is closed properly, and prevents a credit checking in this case. Relay COK checks whether there is sufficient credit registered and operates the clutch for a selected line, and also collects the inserted coins over a coin-collecting solenoid. The CXR relay is operated when the credit is exactly right. This relay terminates the vending cycle by releasing all credit relays without going through any subtracting cycle. The relays FRA, FRB and FRC are all slow-release relays and form a relay train, which comes into operation when the vending cycle is to be terminated due to insufficient credit or no article being delivered. It also provides time delays in the operation of the coin collecting and coin return solenoids. Relay MR is operated when the credit has been checked and controls the take-off motor. Relays LRA and LRB are used only when two of the lines are combined to form a "multiple" line as shown in Fig. 12. The relay SUB is the main subtracting relay which has associated with it the relief relays SUD, SUS and SUF mentioned before. Whenever an article has been released relay AS is operated in case a credit remains after subtraction. This relay prevents the credit from being returned to zero under forced release conditions, for example, when no article has been delivered after the money has been collected in the cash box. The return of coins to the customer is controlled by relay RR. It either operates when the coin-return button is pressed or automatically, if, for example, coins exceeding the capacity of the machine are inserted. Relay CHP is the change pilot relay which is operated by the change and coin return button in cases where the inserted money is already collected in the coin box. The relays CHD and CHS control the change giving in pennies and sixpences respectively.

The last relay box shown in Fig. 13 is the "Line Relays" box. This box contains the line relays 1LR to 8LR and the corresponding sales meters 1SM to 8SM for eight lines. If, for example, the machine is equipped for twenty-four lines 3 relay boxes of this kind have to be provided. The line relays are operated each time a selection button is pressed and remain operated until the cycle of operation is completed. Contacts of these relays control the clutch, trip contact and bin-empty indicator.

In the foregoing the major functions only of the various relays are given: Many of the relays, however, fulfil a number of different functions which will appear later on from the detailed circuit description.

Figure 4:
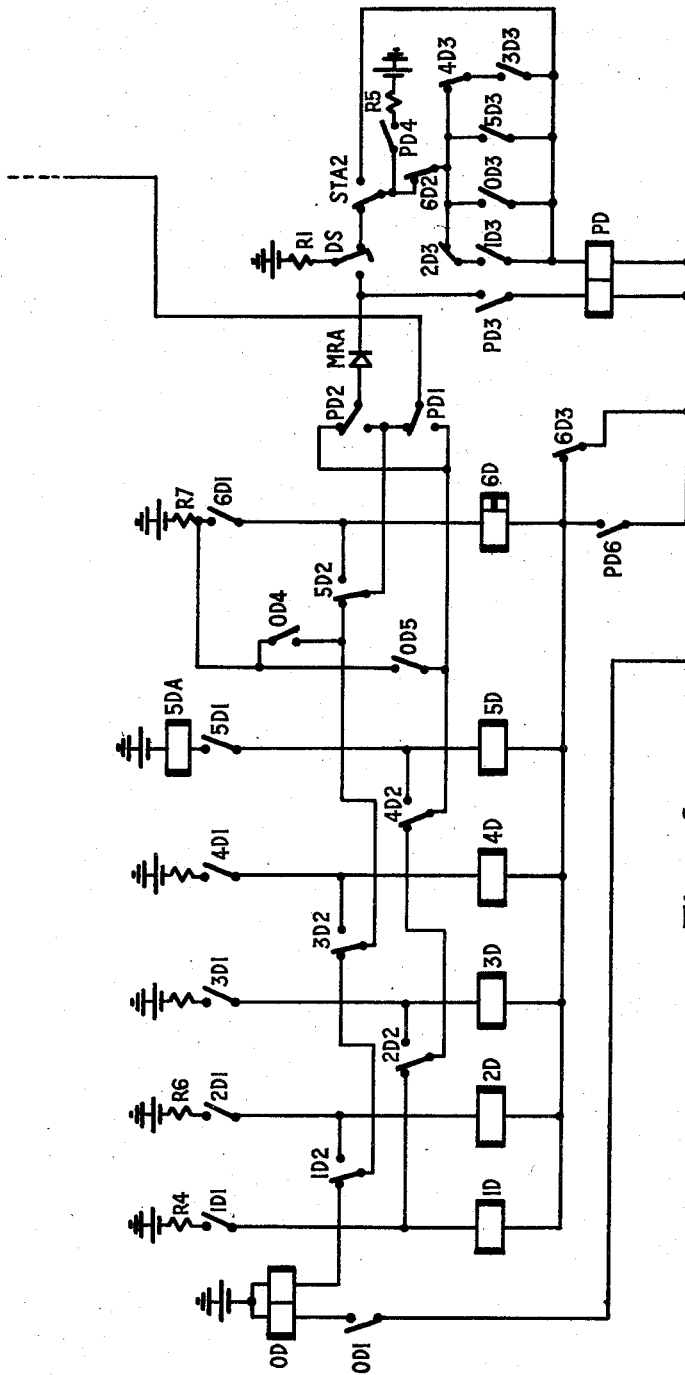
Figure 6:
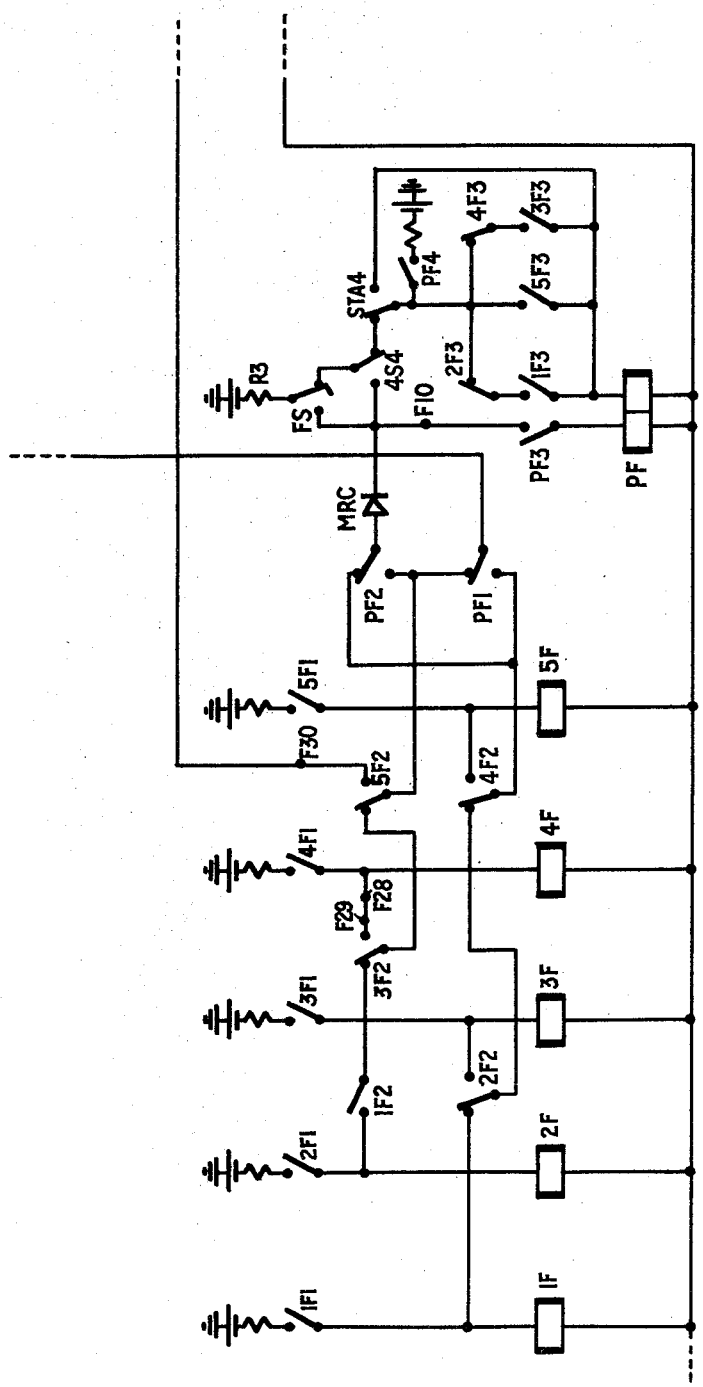
Figure 7:
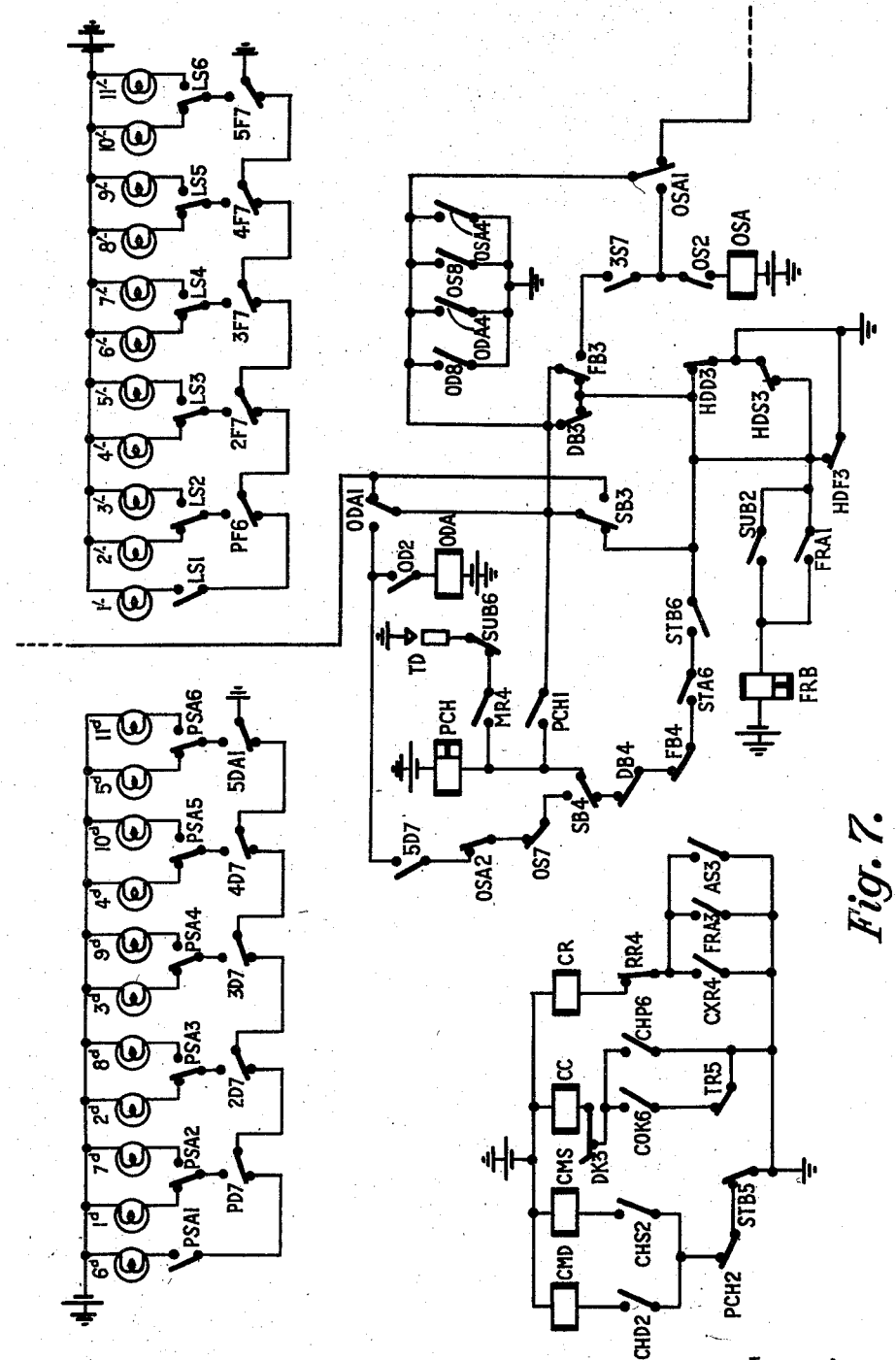

The new vending machine operates briefly as follows:

A customer inserts money into the machine to establish a credit. The machine accepts 1d., 6d. and 2/-d. which are registered by the coin registering relays in Figs. 4, 5 and 6 respectively and the credit is indicated at the lamp indicator (Fig. 7). The customer then proceeds to select the first of his wanted articles by pressing one of the selector buttons K1, K2 . . . (Fig. 10). An electrical check is now made over the pricing frame (Figs. 1, 2, 3) and the registering relays (Figs. 4, 5, 6) to establish whether the registered credit is at least equal to the value of the selected article. If this is confirmed the article is released by operation of the corresponding clutch and the released article operates on its release the trip contact which stops the clutch and starts the subtracting cycle to reduce the credit by the value of the selected article. Indicator lamps tell the customer, when he can proceed with the selection of the next article. At the same time the credit indicator shows the credit still available. When the customer has credit left in the machine he can operate a coin return and change giving button CCR (Fig. 9) and collect the rest of his credit in 1d. and 6d. change. He can also add to the remaining credit by inserting new coins and thus buy another article. When the credit has been finally restored to zero, the machine is in its initial condition ready for operation by the next customer.

A detailed description of the circuits will now be given:

*Coin counting.*—The coins are counted on groups of relays which provide one relay for each counting step to be made in addition to such pilot and control relays as are necessary. Thus, a penny is recorded by the operation of the 1D relay (Fig. 4) and threepence is recorded by the operation of the 1D, 2D and 3D relays. In the case of pennies, the sixth penny operates the 6D relay which carries forward the sixpence by operating the next relay in the sixpenny counting box and releasing the penny relays ready for the insertion of the next coin. The pilot relay PD is used in each box to prepare the circuit for the next impulse after each impulse has been counted. This relay is so arranged that it is operated while the box is recording an odd number of coins but releases when the credit is an even number of coins. The rectifier MRA and the corresponding rectifiers MRB (Fig. 5) and MRC (Fig. 6) prevent sneak circuits which could affect the operation of the pilot relay.

If, for example after operation of relay 2D (Fig. 4), the penny switch DS is restored, as described hereinafter, a sneak circuit would exist from battery over resistor R6, operated contacts 2D1 and 1D2, contacts 3D2 and 5D2, operated contacts PD2 and PD3, relay PD to earth. This circuit would prevent the subsequent release of relay PD. The rectifier MRA, however, inserted between contacts PD2 and PD3 prevents current flowing in this circuit.

Taking the operation step by step, the operation of the penny switch DS (Fig. 4) by inserting 1d. in an appropriate coin slot, applies battery over a 200 ohm resistor R1 through the rectifier MRA, contacts PD2, 4D2, 2D2 to the coil of relay 1D and thence through contacts 6D3, FRA2 (Fig. 9) operated, and COK5 to earth, as the relays FRA (Fig. 9), FRB (Fig. 7) and FRC (Fig. 9) are normally operated and the earth is normally applied to the coils of the counting relays (Figs. 4, 5, 6) and only removed when it is desired to release them.

Relay 1D (Fig. 4) locks over a resistor R4 to battery through operated circuit 1D1. Operated contact 1D2 prepares a circuit for the operation of the 2D relay, but before this relay can operate, contact PD2 must be changed over by the operation of the PD relay.

The PD relay is so arranged that a circuit is prepared for it by operated contact 1D3, but this circuit is only completed when the penny switch has fully restored. Thus there is no possibility of the 2D relay having its operating circuit completed until the penny switch has restored and then re-operated on the passage of another coin.

When the penny switch has restored fully, the battery is applied over resistor R1 through contacts STA2, 6D2, 2D3 and operated contact 1D3 to relay PD and thence to earth as before. The PD relay operates and locks to battery over operated contact PD4 and resistor R5. The operation of contact PD2 now directs the battery at the next operation of the penny switch through contacts 5D2, 3D2 and operated contact 1D2 to relay 2D which operates and locks over its contact 2D1 and resistor R6 to battery. The battery from the penny switch DS is also applied to a second locking circuit for the relay PD through operated contact PD3 and the second coil of relay. Thus the operation of contact 2D3 which breaks the circuit over which relay PD operated does not yet cause this relay to release. When the penny switch DS restores, the locking circuit over operated contact PD3 is broken and relay PD releases, thus an even number of pence has been recorded when the PD relay is released. The restoring of contact PD2 combined with the operation of contact 2D2 now directs the next pulse on the penny switch DS to the coil of relay 3D which operates contacts 3D1, 3D2 and 3D3, and the subsequent release of the penny switch will operate relay PD again, and so counting proceeds by operation of relays 4D and 5D with contacts 4D1, 4D2, 4D3 and 5D1, 5D2, 5D3 respectively as described above.

It will be noticed that in the case of relay 5D, a second relay 5DA is used in place of the resistor in the locking circuit, but this is only to provide an extra contact 5DA1 (Fig. 7) operated in addition to the contacts of the 5D relay, as the relay 5D cannot carry all the contacts required to be operated simultaneously.

The sixth impulse received will be directed over the operated contacts PD2 and 5D2 to the 6D relay. This relay is a slow release relay and will lock from battery over resistor R7 and its operated contact 6D1. The operation of contact 6D2 prepares for the release of the PD relay although this will remain locked over its operated contact PD3 as long as the penny switch is operated. While relay PD is operated its operated contact PD5 bridges contact 6D3 and prevents the operated contact 6D3 from removing the earth from the penny counting relays. At the same time the operation of contact 6D4 (Fig. 5), which is shown adjacent to the sixpence switch SS in the sixpenny counting group, has the same effect as the operation of the sixpence coin switch by an inserted coin and operates the next sixpenny counting relay in the same manner as has been described for the counting of pennies.

When the penny switch DS (Fig. 4) restores again and relay PD releases, earth is removed at contact PD6 from all the relays 1D—6D and all these relays restore. The time delay of the 6D relay ensures that it restores last, and on restoring, it replaces the earth on these relays through its contact 6D3.

The counting of 6d. coins is similar in all respects to the counting of 1d. coins, described above. If a 6d. coin is inserted in an appropriate coin slot, it operates the 6d. switch SS (Fig. 5) and operates relay 1S from battery over resistor R2, switch SS (operated), rectifier MRB, contacts PS2 and 2S2, relay 1S, contact 4S3 to earth through contacts FRA2 (operated) (Fig. 9) and COK5; relay 1S (Fig. 5) locks over its operated contact 1S1 and resistor R8 to battery. When the 6d. switch SS has restored relay PS is operated over operated contact 1S3, contacts 2S3, 4S2, STA3, 6D4, switch SS, resistor R2 to battery, and prepares a further circuit for relay PS over contact PS3. All further operations of switch SS cause the same switching operations to be carried out by the relays 2S and 3S as described above for the corresponding relays in the "penny" counting group (relays 1D—6D). The operation of relay 4S, however, performs a transfer or carryover action into the 2/-d. or florin group in the same manner as described above for relay 6D. Relay 4S (Fig. 5) operates its contact 4S4, which sends a counting pulse into the florin counting group by closing a circuit from battery over resistor R3, florin switch FS, operated contact 4S4, rectifier MRC, contacts PF2, 4F2, 2F2, relay 1F to earth via contacts FRA2 (Fig. 9) and COK5. Thus the first florin is counted in the florin group and at the same time all the sixpence counting relays are released as the earth connection is broken at contact 4S3 (Fig. 5) operated, when relay PS is released in the normal manner. The sixpence relay group includes relay LS which provides additional contacts operable together with the contacts of relay 2S as will appear later. In addition relay PSA is operated together with relay PS to take over some of the functions of this pilot relay.

In the same manner in which pennies and sixpences have been counted, are counted the florins by the florin relay group incorporating the relay 1F to 5F and the pilot relay PF. In this latter case, however, there is no carry over to another counting group if the 5F relay has been operated. If more money is inserted than the machine can count at any stage, then this money has to be returned to the customer. It can be seen that a counting pulse given either by switch FS or contact 4S4 is transferred over contacts PF2 and 5F2 (both operated), motor plug MP (13, 14) and contact SUB3 in parallel (Fig. 9) and contact AS2 to relay RR which returns the money as will be described later on.

The contacts of the penny counting relays and similar contacts of the other counting relays are used as follows:

1D1, 2D1, etc. are locking contacts.

1D2, 2D2, etc. prepare for the operation of the next relay.

1D3, 2D3, etc. prepare for the operation or release of the pilot relay PD, when the coin switch DS has released.

1D4, 2D4, etc. and 1D5 and 2D5, etc. (Fig. 1) are concerned with checking that the credit is sufficient to buy a selected article.

1D6, 2D6, etc. (Fig. 8) operate in conjunction with contact PD5 in the circuit for the operation of the DB relay.

The circuit to this relay is broken whenever the positions of the counting relays and their pilot "disagree." That is to say, if an odd number of relays are operated and the pilot is not operated, or if an even number of relays is operated and the pilot is also operated; the circuit is used during subtraction to indicate when the function of certain of the subtracting relays has been completed, as more fully described later on.

2D7, 3D7, etc. (Fig. 7) operate to control the lighting of the cash lamps. In this case the contact 1D7 is not used but contact PD7 of the PD relay is used instead, so that the contact 1D7 (Fig. 8) is available for use in the change-making circuit.

Contacts 1S7 and 1F7 are also used in the change-making circuit.

There are no contacts of the 6d. relay used in this lamp-lighting circuit, but the relay PSA operates in parallel with the pilot relay PS when an odd number of sixpences is recorded and this changes over the circuit for the penny lamps to light the lamps 6—11 instead of 1—5.

The resistor in the locking circuit of relay 2S is replaced by the LS relay which indicates that 1/-d. is recorded in the "S" box and therefore changes over the lamp circuit control by the relays in the "F" box to add 1/-d. to their indication.

If it is desired to use the circuit to count 1/-d. coins, then these coins should be made to operate two micro switches in succession and these switches should be wired as an extension of the series which include the sixpence switch and the contact 6D4 at present.

Figure 9:
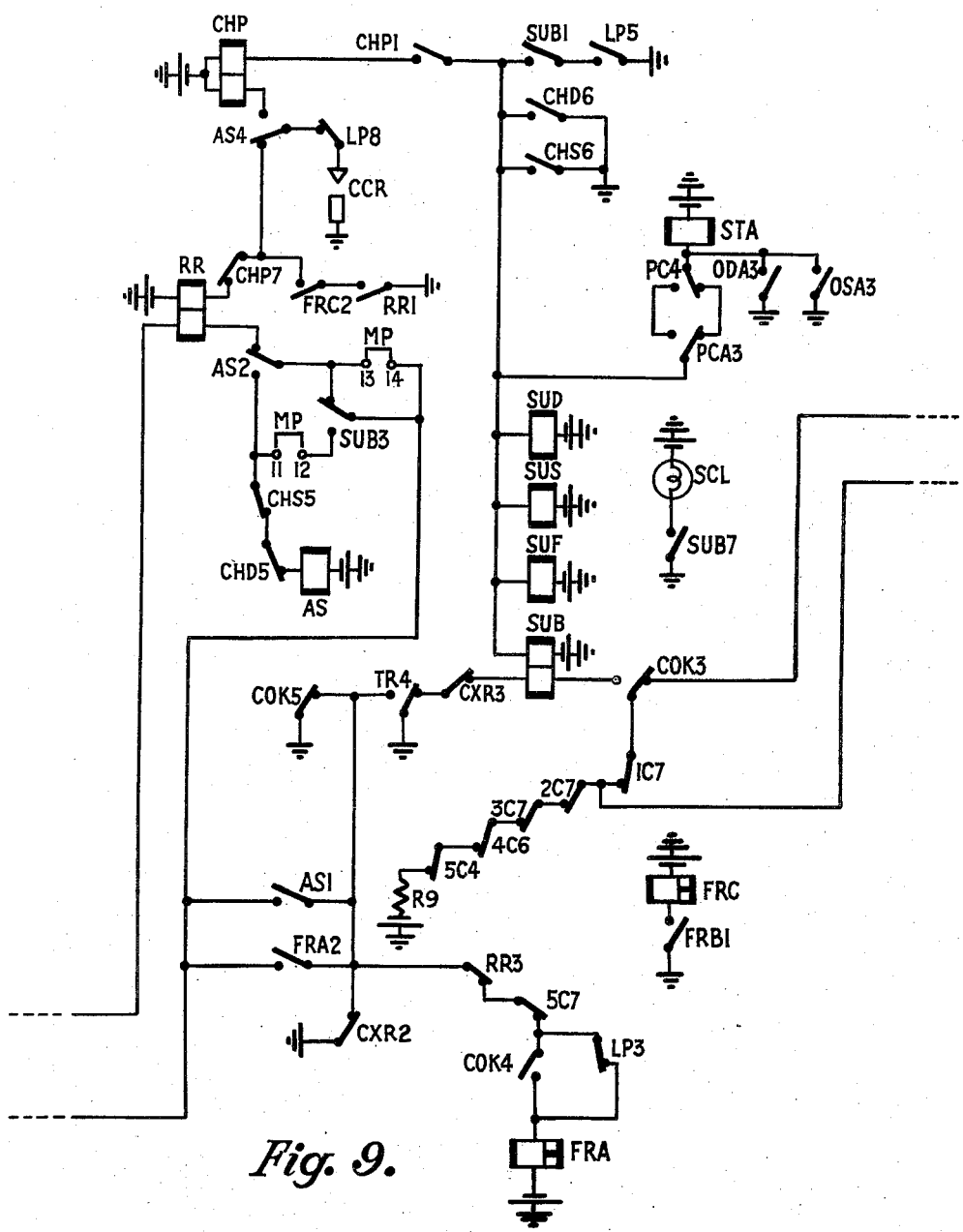
Figures 10, 11:
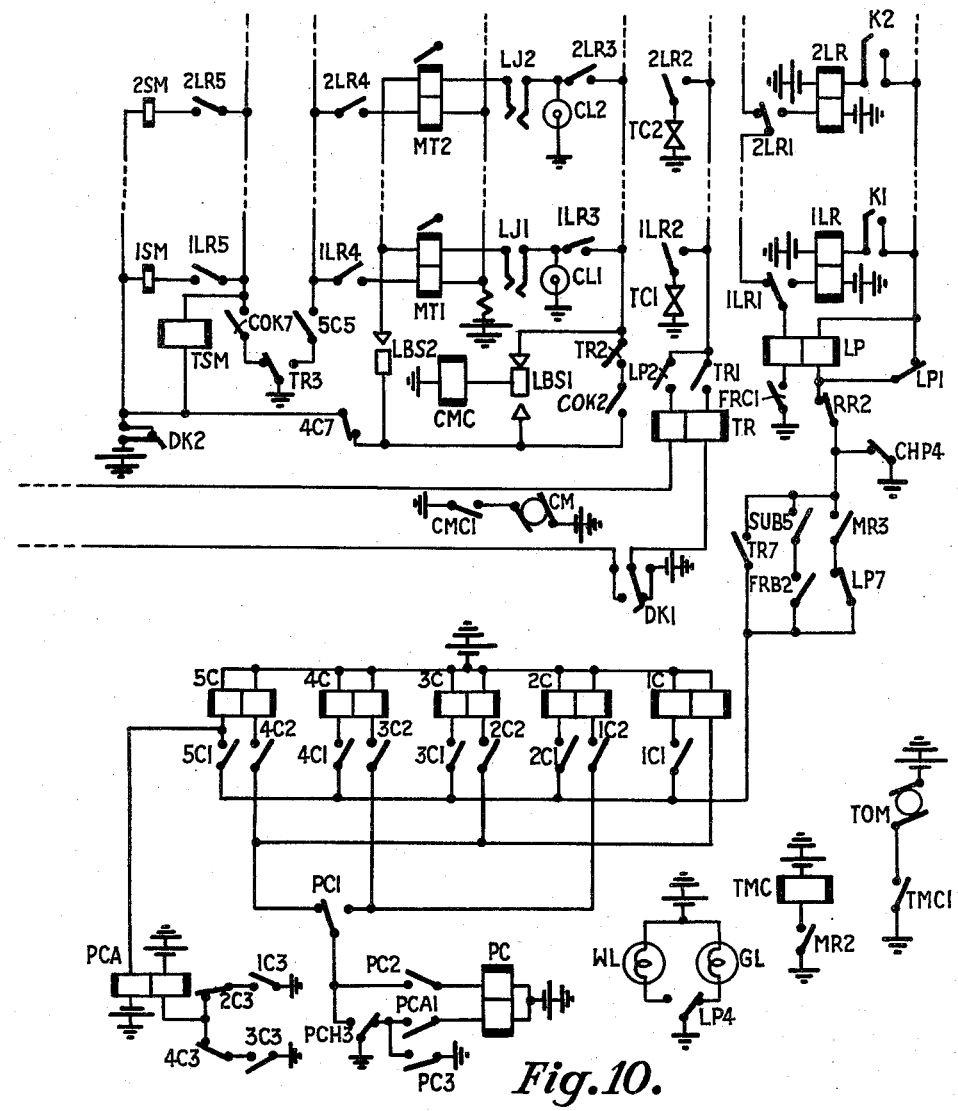
Fig. 11 shows how the Figs. 1 to 10 have to be put together.

*Coin return.*—The facility is provided for returning the coins to the customer before an article has been purchased if the customer operates the "Change and Coin Return" button CCR (Fig. 9). In this case earth is applied from the coin return button through contacts LP8 and AS4 to relay RR, which operates and locks over operated contacts RR1 and FRC2 (FRC relay being normally operated), and contact CHP7. This RR relay will also be operated from the florin circuits if an attempt is made to insert too much money, but in each case it can only operate if the relay AS is released. This AS relay (Fig. 9) operates when an article is sold and does not release again until the credit has been restored to zero; and prevents the customer losing his credit by attempting to get his tendered money back after he had bought an article.

The operated contact RR2 (Fig. 10) removes earth from the relay LP so that operation of the article selecting buttons K1, K2 is ineffective until the coin return cycle has been completed.

Operation of the contact RR3 (Fig. 9) opens the circuit of relay FRA which is slow to release. The operation of contact RR4 (Fig. 7) breaks the circuit of the CR solenoid which is normally operated over contacts FRA3 (operated) and RR4. The solenoid CR is holding the coin return flap in its raised position, and on release the coin return flap thus tilts in such a way that the coins will be returned to the customer.

When the relay FRA (Fig. 9) has released as mentioned above, its contact FRA1 (Fig. 7) opens the circuit of relay FRB which is also slow to release, and its contact FRA2 (Fig. 9) removes the earth from all the counting relays which thus restore and return the credit to zero. Contact FRA3 (Fig. 7) has no effect at this stage. When relay FRB (Fig. 7) releases, its contact FRB1 (Fig. 9) opens the circuit of relay FRC which is also slow to release but its other contact FRB2 (Fig. 10) has no effect at this stage. When relay FRC (Fig. 9) releases, its contact FRC1 (Fig. 10) has no effect, but its contact FRC2 (Fig. 9) breaks the locking circuit for relay RR and if the button CCR has been released, this relay releases again. Its contact RR3 restores the circuit of relay FRA which operates, and in turn operates relays FRB (Fig. 7) and FRC (Fig. 9) whilst contact RR4 (Fig. 7) restores the circuit to the CR solenoid and brings the coin return mechanism up to its closed position again.

*Article selection and credit checking.*—The article-selecting buttons K1, K2 (Fig. 10), when operated apply earth through contacts CHP4, RR2 and LP1 to the line relays 1LR, 2LR, etc. and when one of these relays operates, it locks over its operated contact 1LR1, 2LR1 etc. through the coil of the line pilot relay LP and operated contact FRC1 to earth. If two buttons were pressed simultaneously, two line relays might operate together, but only one would lock, as the locking circuits are taken through the back contacts of each previous relay.

Contacts of each line relay prepare circuits as follows:

1LR2, 2LR2, etc. prepare the circuit for the trip-switch TC1, TC2, etc.
1LR3 prepares the circuit for the clutch CL.
1LR4 prepares the circuit for the operation of bin-empty indicator MT1.
1LR5 prepares a circuit for a meter 1SM which counts the number of articles sold.
1LR6 (Fig. 1), 1LR7 (Fig. 2) and 1LR8 (Fig. 3) prepare circuits to the horizontal bars of the pricing frames in the three denominations—pence, 6d. and florins.

The completion of one of the line relay locking circuits through the coil of relay LP operates this relay which breaks the operated circuit through the operated selecting button at its operated contact LP1. A "go ahead" lamp GL is normally operated over contact LP4. When relay LP operates, this contact changes over, extinguishes lamp GL and lights up the "wait" lamp WL, to indicate that the customer has to wait with the further selection until relay LP has released again. A circuit still exists to the selecting button through a high resistance coil of relay LP, but the current through this coil is so small that no line relays can remain operated through that circuit. The circuit is there only to ensure that the relay LP cannot release until the selecting button has been released and is to prevent the customer receiving two articles of the same kind if he holds the button down for a long time and has sufficient credit to buy the second article.

Operated contact LP2 (Fig. 10) completes a circuit over the trip relay TR from battery, resistor R9 (Fig. 9), contacts 5C4, 4C6, 3C7, 2C7, 1C7 and COK3, relay TR (Fig. 10), operated contacts LP2 and 1LR2, through the trip switch TC1 to earth. The operation of relay TR completes a locking circuit through operated contact TR1 and the second coil of relay TR. Thus, a line has been selected and a check has been made that the trip switch is making contact. The next thing is to check whether the credit available is sufficient to buy the article selected. There are three different cases that can occur—the credit can be insufficient; the credit can be exactly right; or the credit can be excessive. The article will be delivered in either of the two latter cases but a record must be made of which case exists so that either the price has to be subtracted after the article has been delivered, or the earth has simply to be removed from the coin relays to restore the credit to zero.

To make the check, earth is applied through operated contact TR6 (Fig. 3), contact SUB4 and operated contact 1LR8 to the horizontal bar of the florins in the price, then the circuit will be through the screw in the zero position, through the zero vertical bar, contacts SUF1, 1F5 and SUS5 (Fig. 2), and operated contact 1LR7 to the horizontal bar in the 6d. section. Assuming again that there are no sixpences in the price, the circuit will proceed through the screw and zero vertical bar to contacts SUS1, 1S5, SUS6 (Fig. 1) and operated contact 1LR6 to the horizontal bar of the pence section. Assuming now that the article is priced at 2d. and that only 1d. is recorded as credit, the earth will be applied to the 2d. vertical bar through contacts SUD3, 3D5, but will not proceed further as neither 2D5 nor 3D4 contacts are operated. A similar stoppage would have occurred in either the 6d. or florin box if the price included either of these denominations and the credit was insufficient.

As the credit is insufficient, further operations must take place to release the circuits and, if the customer's money is still available in the coin return device, to return this to him and cancel his credit.

The operation of relay LP (Fig. 10) breaks the circuit for relay FRA at operated contact LP3. This circuit would be restored by a contact COK4 of the COK relay (Fig. 1) which would operate if there were sufficient credit, but since the credit was insufficient, this relay did not operate and relay FRA (Fig. 9) released. Its contact FRA1 (Fig. 7) breaks the circuit of relay FRB which is also slow to release, and contact FRA3 breaks the circuit to the coin return solenoid CR, thus returning the money to the customer. Contact FRA2 (Fig. 9) breaks the earth circuit for all the coin counting relays which release and thus return the credit to zero. The releasing of relay FRB (Fig. 7) releases relay FRC (Fig. 9) and this in turn releases relays LP and 1LR at contact FRC1. Opening of contact 1LR2 releases the trip relay TR and release of the line pilot relay LP restores the circuit of relay FRA (Fig. 9) at contact LP3 and this relay in turn restores relays FRB (Fig. 7) and FRC (Fig. 9) thus restoring the circuits to normal.

It will be noted that in the operations above, the contacts FRA2 (Fig. 9) and FRA3 (Fig. 7) are paralleled by contacts AS1 and AS3 respectively of relay AS (Fig. 9) so that if this relay had been operated (as it would if an article had been sold and the coins collected) as described later, then the line relays would have been restored but the credit would still remain available to the customer.

Assuming now that the credit had been 2d. the circuit through the pricing frame would be as before, only now it would be completed through operated contacts 2D5 and 1D5 (Fig. 1), points 3 and 4 of a meter plug MP to relay CXR. Relay CXR would operate and its operated contact CXR1 would permit the same earth to be applied to relay COK which operates and locks through operated contacts COK1 and LP6. The meter relay MR operates in parallel with relay COK and locks itself from earth over contacts 5C6 and MR1.

If we now look at the case where the credit was 3d. instead of 2d., we find that the previous circuit is now broken at operated contact 3D5 (Fig. 1), but an alternative circuit is available through operated contacts 3D4, 2D4 and 1D4, points 2 and 1 of the meter plug to relay COK which operates and locks as before, but this time without the operation of relay CXR. Should the credit be in either of the higher denominations have been greater than the price of the article in that denomination, then the circuit would have been taken direct to relay COK through contacts such as 1S4 (Fig. 2) or 1F4 (Fig. 3) etc.

The next sequence of operations up to the time that the trip switch operates will be the same whether the relay CXR had operated or not.

It may be noted here that the strappings on the meter plug may be varied so that when cash meters are used the relay CXR is never allowed to be operated, so that the price of all articles sold will be subtracted; and also it is possible to strap only points 3 and 4 so that articles can only be sold if credit is exactly right, in which case the relays would be cleared down and money returned if the credit were either too high or too low.

We are now to the position where the credit has been determined to be sufficient to buy the article, and the next operation will be to operate the clutch. Battery is applied to the clutch CL1 over disabling key DK2 (Fig. 10), through contact 4C7 and operated contacts COK2, TR2, and 1LR3. This battery is also applied through the loading bar switch contacts LBS1 to the clutch motor contactor CMC which is operated as long as the clutch is operated. Operated contact COK3 (Fig. 9) breaks the circuit through which the trip relay TR (Fig. 10) operated so that when the trip switch TC1 opens at the release of an article, this relay will release and remain released. Contact COK3 (Fig. 9) also prepares the circuit for the subtracting relay SUB. Operated contact COK4 restores the circuit of relay FRA which being slow to release, will still be operated at this stage. Operated contact COK5 removes an earth from the counting relay circuit, but an earth is still applied to this circuit through the operated contact TR4 of the trip relay TR (Fig. 10). Operated contact COK6 (Fig. 7) prepares a circuit for the operation of the coin collecting solenoid CC but this circuit is still ineffective at this stage as contact TR5 is still open.

There are now two possibilities to be considered—either the trip will operate when the article falls off or if the article is out of stock or jammed, the trip will not operate and after a reasonable movement of the belt, the circuits must be cleared down.

Taking this latter case first, a time delay is provided by a contact TD operated from the take-off wheel or conveyor belt, and this contact operates relay PCH over contact SUB6 and operated contact MR4 and thus operates over contacts PCH3 (Fig. 10) and PC1, the relays 1C, 2C, 4C and 5C in turn. Detailed operation of this circuit need not be considered at this stage, but before the trip relay TR could be operated all these relays were released and any that had been operated had been released by the operation of contact LP7. The successive operation of relays 1C, 2C and 3C has no effect on the clutch circuit, but the operation of relay 4C opens the clutch circuit at operated contact 4C7.

Cases have been known in the past where an article was on the verge of tripping when the clutch was released and these articles would fall from the shelf but not be charged for. In this equipment, however, a further time delay elapses until relay 5C operates before the circuits are finally cleared down.

Operation of relay 5C (Fig. 10) breaks the circuit of relay FRA (Fig. 9) at operated contact 5C7. Operated contact 5C5 (Fig. 10) completes a circuit for the bin-empty indicator MT1 through operated contacts 1LR4, 5C5 and TR3 to earth, thus operating the bin-empty indicator if it is not already operated. The release of relay FRA releases the coin return solenoid CR (Fig. 7) by opening contact FRA3, thus returning the coins to the customer; contact FRA2 (Fig. 9) removes the earth from the counting relays (both these operations taking place only if relay AS is released), and contact FRA1 (Fig. 7) releases relay FRB. Relay FRB releases relay FRC (Fig. 9) in turn, and contact FRB2 (Fig. 10) has no function at this stage. The release of relay FRC (Fig. 9) releases at contact FRC1 (Fig. 10) the line and line pilot relays 1LR and LP which in turn release the trip relay TR and the credit checking relays COK and CXR (Fig. 1) (if the latter is operated), and also the motor relay MR. The release of relay TR also releases the relays in the train 1C—5C (Fig. 10) as we now have the contacts MR3, FRB2 and TR7 all open.

*Operation of the trip-switch.*—If an article were released from the belt when the clutch operated, operation of the trip switch TC1 (Fig. 10) would break the circuit of the trip relay TR which would release and could not re-operate as its circuit would be broken at contact TR1 and also at operated contact COK3 (Fig. 9).

Here again there are two cases to be considered, the simpler one being that which occurs when the relay CXR (Fig. 1) is operated to indicate that the credit was exactly right. All that needs to be done then is to collect the money and release the counting relays to restore the credit to zero. Release of the counting relays is effected by the release of contact TR4 (Fig. 9) as this, in conjunction with operated contacts CXR2 and COK5, removes the three possible sources of earth from the counting relays. They also remove the earth from relay FRA which releases slowly.

Operated contact CXR3 (Fig. 9) prevents the operation of the subtracting relay SUB. Operated contact CXR4 (Fig. 7) ensures that the coin return solenoid CR remains operated, while the release of contact TR5 operates the coin collecting solenoid CC over operated contact COK6 and disabling key DK3. When relay FRA (Fig. 9) releases it releases relay FRB (Fig. 7) but owing to the operation of relay CXR (Fig. 1) its contact FRA3 (Fig. 7) cannot release the coin-return solenoid as this contact is by-passed by contact CXR4. When relay FRB releases, its only effect is to release relay FRC (Fig. 9); relay FRC then breaks the circuit of the line relay and line pilot relays 1LR and LP at its contact FRC1 (Fig. 10). The release of LP then permits the release of relays COK and CXR (Fig. 1) and the re-operation of relays FRA, FRB and FRC, thus restoring the circuits to normal and releasing the CC solenoid (Fig. 7) at contact COK6.

It will be noted that the relay AS (Fig. 9) locks to the same earth as the counting relays so that when these relays were released, relay AS was also released if it had been operated.

The other case which follows the release of the trip relay is when the CXR relay was not operated as the credit exceeded the price of the article, and in this case the release of relay TR (Fig. 10) is followed by the release of any of the relays in the train 1C—5C since their locking circuit is now broken at operated contact LP7 and contacts SUB5 and TR7, and then relay SUB (Fig. 9) operates from battery over resistor R8, through contacts 5C4, 4C6, 3C7, 2C7 and 1C7; operated contact COK3, coil of relay SUB, contacts CXR3 and TR4 to earth. The relay SUB operates and locks itself and also operates its relief relays SUD, SUS, and SUF over operated contacts LP5 and SUB1. These four relays transfer the circuits into the correct arrangement for subtracting; which involves diverting the circuits of the vertical bars of the pricing frame away from the cash checking circuits and onto the subtracting control circuits.

The subtracting cycle is best considered as an entirely separate function starting at this point, but before doing this it is as well to consider the function of the article sold relay AS which has been mentioned several times and often determines the sequence of the operations described above.

*"Article Sold" or "Return Control" Relay:*—If a customer inserts some money into the machine when the credit is at zero, then he should be able to get that money back from the coin return device in the following cases:

(a) by pressing the coin return button CCR (Fig. 9) (he may change his mind or dispute the addition of the credit).
(b) If he selects an article for which his credit is not sufficient.
(c) If he selects an article which is out of stock.
(d) If the trip switch of the line is open circuit.
(e) If he inserts 12/-d. or more.

It is possible to return the money to him and cancel his credit by releasing the counting relays as long as he has not purchased an article. If the customer buys one article and uses part of his credit all the money already in the coin return device will be collected into the machine. Now, if any of the cases listed above should occur, there is no money there to be returned to him, so there is no object in operating the coin return device and we must not deprive him of the rest of his credit. Therefore, the article sold relay AS (Fig. 9) is provided which operates over meter plug MP (11, 12) and contact SUB3 of the subtracting relay SUB whenever part only of the credit available is used to buy an article, and that article is actually delivered from the machine. Relay AS protects the customer being deprived of his remaining credit. As his credit is spent the AS relay will remain operated and will only release when he buys an article for the exact amount of credit remaining, when the credit will be restored to zero and the AS relay released. Provision is also made for releasing this relay if the remaining credit is taken out in change.

Figure 1:
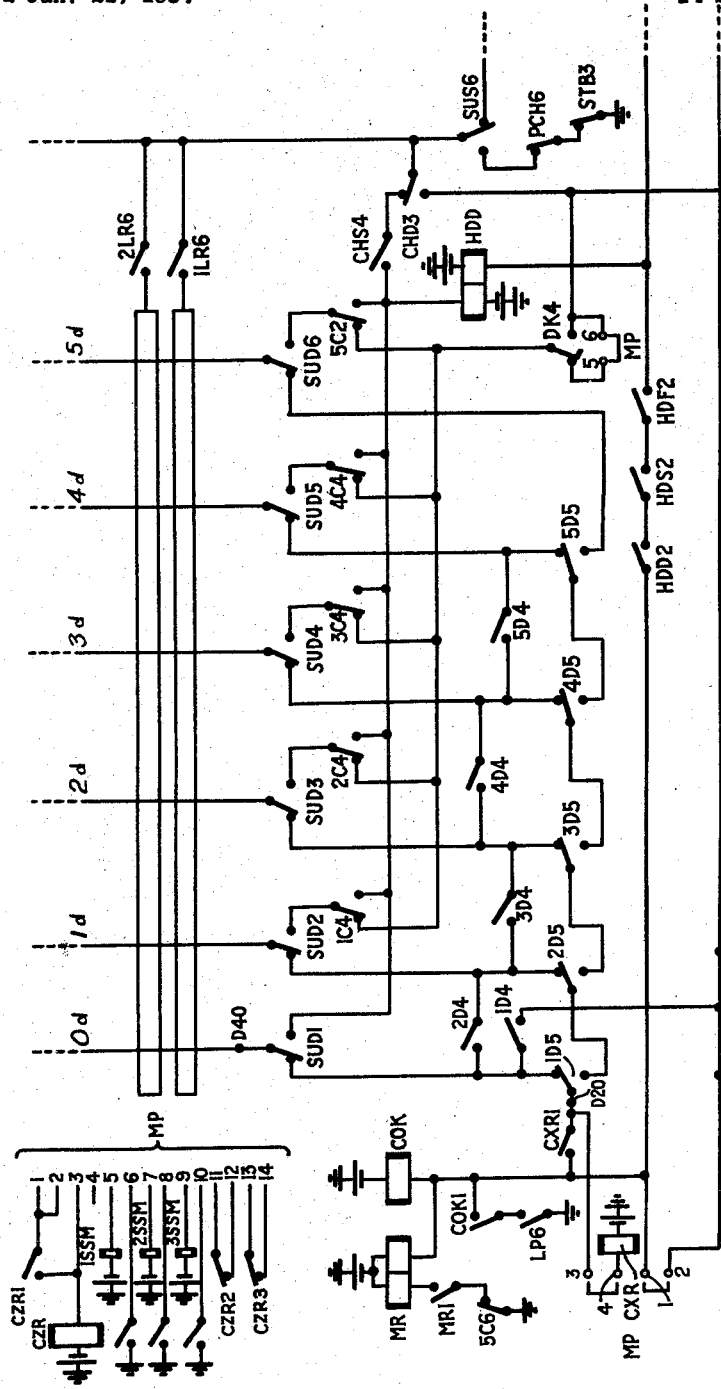
Figs. 1 to 10 show the circuit diagram of one embodiment of the invention.
Figure 2:
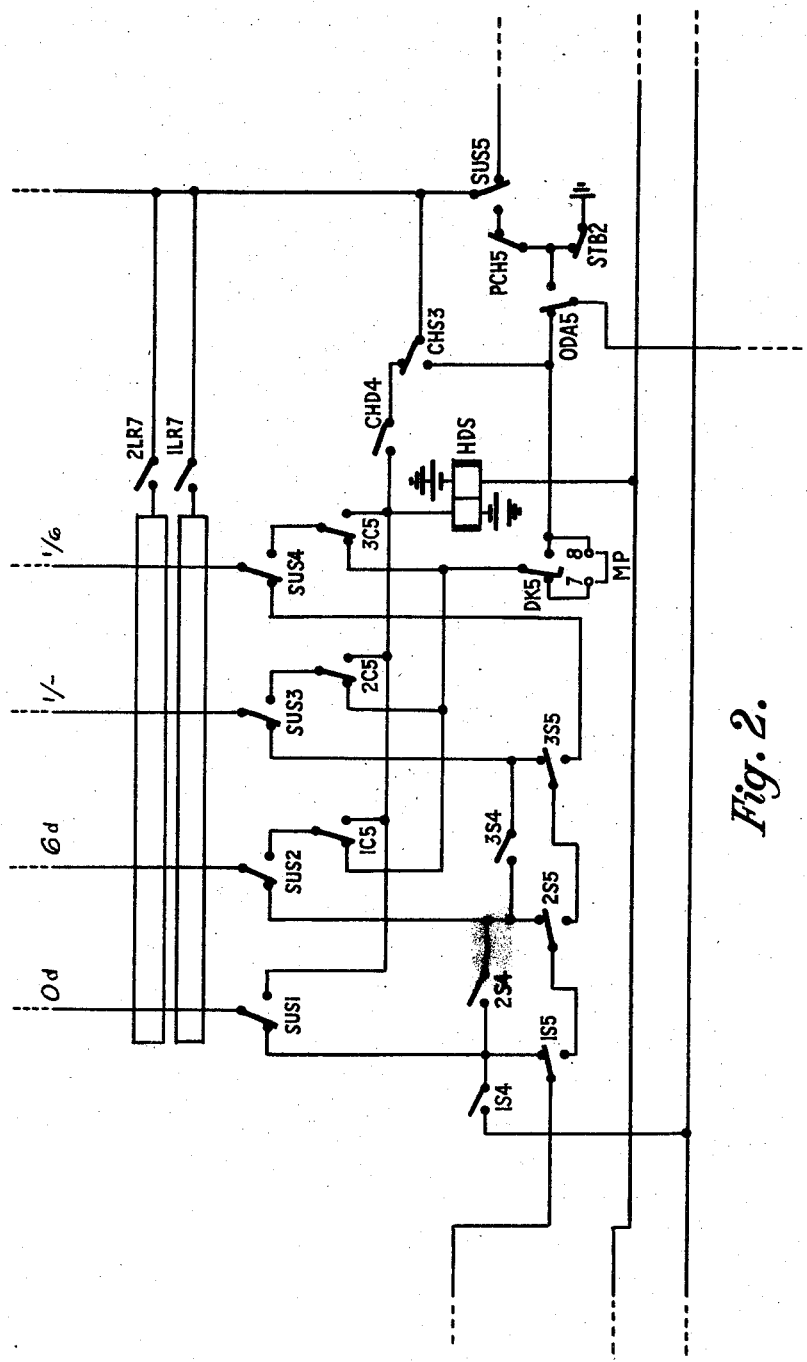

When cash meters are wired into the circuit, it is necessary to prevent the operation of relay CXR (Fig. 1)

as this would by-pass the subtracting operation and we would not get accurate figures on the value of articles sold. As the CXR relay normally effects the release of the "Article Sold" relay AS, this relay would never be released if we simply eliminated CXR by strapping taps 1, 2 and 3 (Fig. 7) on the meter plug. The proper release of relay AS is ensured by adding an external relay CZR along with the meters 1SSM, 2SSM, 3SSM when the meter plug MP is plugged in. This relay operates from the No. 3 point of the meter plug in a similar manner to the normal operation of relay CXR and also supplies earth over contact CXR1 through point 1 to COK relay; but by breaking circuits at contacts CZR2 and CZR3 connected between points 11 and 12 and points 13 and 14 (Fig. 9) on the meter plug it ensures that relay AS is properly released when the last of the credit is spent.

*Subtracting.*—The subtracting cycle is started when the trip relay TR (Fig. 10) releases and relay COK (Fig. 1) is operated, but relay CXR is not operated. Relay SUB (Fig. 9) operates, as described previously, and locks itself over operated contacts LP5 and SUB1 and also operates its three relief relays SUD, SUS and SUF. In addition, we have the line and line pilot relays 1LR and LP operated; COK is also operated and the normal operated relays FRA, FRB and FRC are operated.

Figure 8:
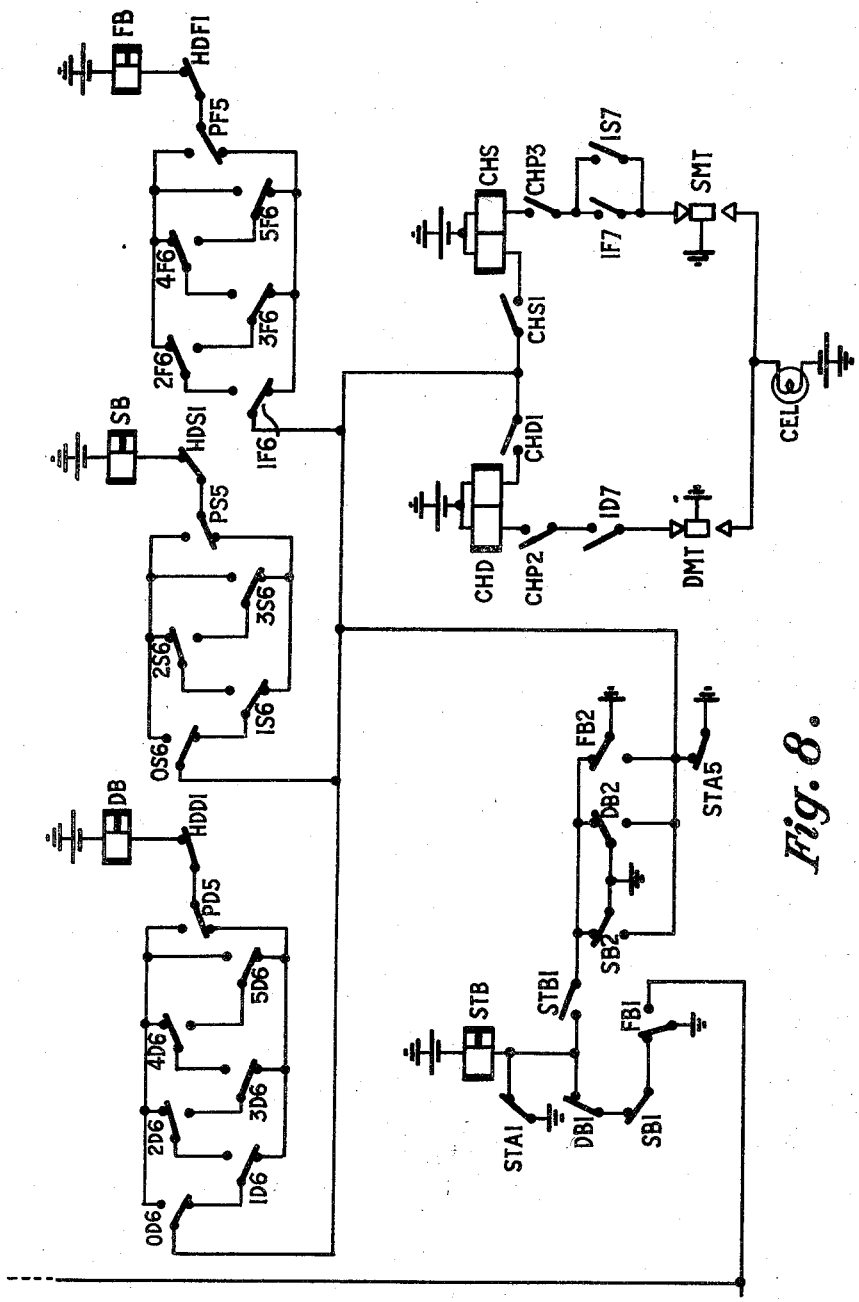

All these relays will remain operated until the end of the subtracting cycle. At this stage there are also three relays which have been operated throughout but which have not yet been considered. These are the relays DB, SB and FB (Fig. 8). The operating circuit for each of these relays is through contacts of the coin relays in the appropriate coin counting relay boxes and their pilot relay, so that, for example, the DB relay is operated if an odd number of pence is recorded and the pilot relay PD (Fig. 4) is operated, and alternatively, when an even number of pence is recorded and the pilot relay PD is released. These relays will be used during subtracting to detect when the appropriate coin relay has been released and then later to check that its pilot relay has either released or operated.

It will be convenient to describe first what happens when the price of 2d. is subtracted from a credit of 4d. In this case there is no subtraction to be effected in either the 6d. or florin sections, and we have to release two of the pence relays. The SUB relay prepares certain of the circuits for subtracting and the main function of the SUD, SUS and SUF relays is to divert at contacts SUD1 to SUD6 (Fig. 1) SUS1 to SUS4 (Fig. 2) and SUF1 to SUF6 (Fig. 3) the leads from the vertical bars of the pricing frame over to circuits which control the subtracting. The lead from each vertical bar is passed further over a contact of one of the relays 1C—5C which will be operated in turn, and in the case under consideration the lead from the 2d. vertical bar which will be earthed will pass through the operated contact SUD3 (Fig. 1) and contact 2C4. In the normal position of contact 2C4 earth pulses on the vertical bar will be applied to the counting relays to release them, but after two such pulses have been passed on, the contact 2C4 will change over, and the next pulse will be diverted to operate the relay HDD, as will be seen in detail later on. Any further pulses would be similarly diverted to relay HDD although as the other denominations are not subtracting, no more pulses are required and the operation of relay HDD will terminate the subtracting cycles.

In the pennies counting circuit the counting relays are operated in succession by applying a battery to arm of contact PD2 (Fig. 4) as described before to represent the increased credit, and when subtracting, it is necessary to release these relays in reverted order and to effect this, earth is applied to the arm of contact PD1, as will be described in detail hereinafter.

Assuming that four relays are operated in the penny counting group (Fig. 4), then the pilot relay PD will be unoperated and the earth will be extended from contact 2C4 (Fig. 1), switch DK4 and plug MP (5, 6), through contacts PD1 (Fig. 4), 5D2 and 3D2 operated, to the coil of relay 4D. The battery applied over a resistor through operated contact 4D1 will thus be earthed and the relay now having earth on both sides, will released. The contact 4D3 now releases the pilot relay PD and this relay would re-operate were it not for contact STA2 which must be operated before the earth is applied and must not be released until after the earth has been removed. There is a contact of this STA relay in each counting circuit and it functions to inhibit the pilot relay in each case; i.e. if the relay is operated it prevents it from releasing until the STA relay itself is released, if the relay is unoperated, it prevents it from operating.

The earth pulses will be applied by the release of relay STB (Fig. 8), which is normally operated, and the subtracting is controlled by the inter-connection of the two relays STA (Fig. 9) and STB (Fig. 8) with the relay PCH (Fig. 7) which counts the number of pulses that have been transacted, and the three relays DB, SB and FB (Fig. 8) which detect if the earth pulses have had the desired effect of releasing their relays.

It will be noted that the relays STB, DB, SB, FB and PCH are heavily slugged to make them slow to release. A small part of this delay is necessary to ensure that the counting relays release fully before the earth pulse is removed, but their principal object is to slow down the operation of the subtracting so that when it is used in conjunction with the change-giving arrangement, there will be time for the change solenoids to operate properly.

The subtracting operation proceeds as follows:

The earth from the contacts LP5 and SUB1 (Fig. 9) which locks the SUB relay, also operates the relay STA over contacts PCA3 and PC4. Operated contact STA1 (Fig. 8) breaks the circuit to relay STB as the other circuits for relay STB are broken by contacts of the DB, SB and FB relays which are all operated; relay STB is slow to release. Operated contacts STA2 (Fig. 4), STA3 (Fig. 5), and STA4 (Fig. 6) inhibit the pilot relays PB, PS and PF respectively. Contact STA6 (Fig. 7) has no function at this stage. On the release of relay STB earth is applied through contacts STB3 (Fig. 1) and PCH6, operated contacts SUS6 and 1LR6, to the horizontal bar of the pence section of the pricing frame, thence through the 2d. vertical bar and operated contact SUD3 and contact 2C4, through switch DK4 and points 5 and 6 of the meter plug MP to contacts PD1 (Fig. 4), 5D2 and 3D2 to the coil of relay 4D which being thus short-circuited, releases and breaks its previous locking circuit at contact 4D1. Thus we released one of the counting relays. Similarly earth is applied through contacts STB (Fig. 2), PCH5, operated contacts SUS5 and 1LR7 to the horizontal bar of the 6d. section of the pricing frame through the zero vertical bar and operated contact SUS1 direct to coil of relay HDS which operates. A similar circuit exists starting at contact STB4 (Fig. 3) and finishing at relay HDF for the florin section.

Operated contact HDS1 (Fig. 8) will break the circuit over relay SB and similarly operated contact HDF1 will break the circuit to relay FB. These two relays release slowly. The circuit of relay DB is broken by the release of contact 4D6. Previously this circuit was from earth over operated contact DB2 through contact OD6 and operated contacts 1D6, 2D6, 3D6 and 4D6; contacts 5D6, PD5 and HDD1 to relay DB. The release of contact 4D6 breaks this circuit (but prepares a new circuit for the re-operation of relay DB when contact PD5 operates), thus the three relays DB, SB and FB will release.

When relays DB, SB and FB have released, the circuit over relay STB is completed over their contacts FB1, SB1 and DB1. This relay operates and removes the earth from the penny counting circuit where relay 4D has already released. It releases also the relays HDS and HDF. However, the relays DB, SB and FB do not yet re-operate as their earth circuit is broken at contacts DB2, SB2 and FB2 and operated contact STA5.

Operation of relay STB also operates relay PCH (Fig. 7) over earth which comes from the contact HDD3, operated contacts STB6, STA6 and contact FB4, DB4 and SB4. Relay PCH locks over its contact PCH1 and contacts DB3, SB3 and FB3 in parallel. It will be noted that both relays PCH and STB require for their operation that all three relays DB, SB and FB be unoperated, but that once they have operated, relays PCH and STB will lock to any of these three relays in the unoperated position so that all three must have operated before relays PCH or STB can release.

The main purpose of relay PCH is to operate in turn the relays in the train 1C—5C. The operation of these relays is rather similar to that of the coin counting relays except that the circuit is simpler and the operation is effected by applying an earth instead of a battery. In this case the operated contact PCH3 (Fig. 10) applies earth through contact PC1 to relay 1C which operates and locks through its operated contact 1C1 to earth over operated contacts FRB2 and SUB5, and contact CHP4. The pilot relay PC of this group is not operated at this stage but contact 1C3, being operated causes operation of relay PCA. Operation of relay PCA breaks the circuit over relay STA (Fig. 9) at operated contact PCA3. Relay STA releases and thus permits the pilot relay PD (Fig. 4) of the pennies group to operate from battery over resistor R1, penny svwitch DS, contacts STA2, 6D2 and 4D3, and operated contact PD4 and resistor R5.

The release of relay STA also applies an earth at contact STA5 (Fig. 8) to the circuit for the operation of relays SB and FB which now operate and when PD has operated, the circuit is completed at operated contact PD5 for the re-operation of DB.

As relays SB, DB and FB are now all operated, the locking circuit for relay PCH (Fig. 7) is broken, and this relay releases slowly. When it does release, contact PCH3 (Fig. 10) permits the operation of the pilot relay PC over operated contact PCA1. Since both the relays PC and PCA are now operated, relay STA (Fig. 9) is able to re-operate over contacts PC4 and PCA3.

This completes the first subtracting pulse and leaves the relays STA and STB both operated as well as the relays DB, SB and FB. This was the condition at the start of the subtracting operation and so another cycle of operation will now take place exactly similar to the one already described with the exception that this time when relay STB releases, the earth pulse will be applied through contact PD1 (Fig. 4) which is not operated and through contact 4D2 to release relay 3D. When relay PCH operates a little later it will operate the relay 2C (Fig. 10) which in turn releases relay PCA at contact 2C3, and a little later again, the pilot relays PD (Fig. 4) and PC (Fig. 10) will be released.

This cycle finishes again when relay STA re-operates and a third cycle starts with the subsequent release of relay STB.

We have now released the two counting relays; whereas there were four relays operated at the start of the subtraction there are now only two representing a credit of 2d. The third cycle will not release any more relays but will simply clear down the circuits.

When relay STB released, it caused the operation of HDS and HDF as in the two previous cycles, but this time the earth applied to the contact 2C4 (Fig. 1) in the penny section will be diverted to relay HDD as the contact 2C4 is now operated. Now, for the first time, we have the three relays HDD, HDS and HDF all operated together, and these three relays all lock up over their second coils to earth through operated contacts LP6 (Fig. 1) COK1, HDD2, HDS2 and HDF2.

Contacts HDD1, HDS1, HDF1 (Fig. 8) of these three relays will now release the relays DB, SB and FB. Operated contacts HDD3, HDS3 and HDF3 (Fig. 7) also remove the earth from relay FRB which releases slowly and when it has released, breaks the locking circuit for the relay train 1C—5C (Fig. 10) at contact FRB2 so that the relays 1C and 2C release.

The release of relay FRB also releases relay FRC which in turn releases relay LP and 1LR, and relay LP releases relays COK, SUB, SUD, SUS, SUF and STA at contacts LP5 and LP6 respectively.

The release of the line relay 1LR and the line pilot LP breaks the circuits for both windings of the relays HDD, HDS and HDF which release and restore the circuit for the relay FRB (Fig. 7) which will operate and in turn operate relay FRC. By this time, the three relays DB, SB and FB will have released and permit relay STB to re-operate. The releasing of relay STA and of relays HDD, HDS and HDF will permit the re-operation of relays DB, SB and FB so that all relays are now restored to normal. Credit has been reduced by the appropriate amount and the only other change from the condition at the beginning of the transaction is that the article sold relay AS which operated when the article was delivered, will remain operated so that the customer cannot be deprived of his remaining credit.

When there are amounts to be carried down in two or three denominations, each denomination behaves exactly as described above for the pennies denomination, and when the correct deduction has been made in each denomination, any further earth pulses received are passed over an operated contact of one of the relays 1C—5C to the HDS or HDF relay to permit the operation of the other denominations while deduction in that particular denomination is held. Pulses will continue to be sent and counted in the train 1C—5C until all three relays HDD, HDS and HDF operate to indicate that the subtraction is completed, when the circuits will be cleared down as previously described.

*Carrying-down.*—When it happens that the credit in any denomination is insufficient for the price to be subtracted from it, as in the case of subtracting 2d. from 6d., where there are no penny relays operated, the subtracting cycle must be held up until 6d. is carried down from the 6d. counting group. To effect this, when the 1D relay has been released, the next earth pulse will be steered through contacts PD1 (Fig. 4), 5D2, 3D2 and 1D2 to the zero pence relay OD. This OD relay locks over its contact OD1, contact ODA1 (Fig. 7), and operated contact OD8 to earth. The subtracting cycle will proceed normally until the relay PCH operates and when this relay closes contact PCH1, it locks to earth over contact OD8, in addition to its normal locking circuit. This ensures that relay PCH cannot release until the carry-down cycle has been completed.

When relay OD operated, its contacts OD4 and OD5 (Fig. 4) applied battery over resistor R7 to both sides of the contacts PD1 and PD2, but as long as the earth is applied from contact STB3 (Fig. 1) this battery is simply short-circuited over resistor R7 to earth. However, when STB re-operates, the earth is removed and since battery is applied on both sides of the PD contacts (Fig. 4) it results in the operation of relay 1D and as soon as contact 1D2 has operated, relay 2D operates; operated contact 2D2 operates relay 3D; operated contact 3D2 operates relay 4D; and operated contact 4D2 operates relay 5D. At this point relay ODA (Fig. 7) will operate from earth, operated contacts OD8, PCH1, SB4, contacts OS7, OSA2; operated contacts 5D7 and OD2, relay ODA to battery.

As relay SB has operated by this time, a second locking circuit is available for relay OD over operated contact SB3 (Fig. 7). Thus relay OD is not released when contact ODA1 operates and locks relay ODA to earth over operated contacts OD8 or ODA4. Operation of relay ODA also operates relay STA (Fig. 9) over operated contact ODA3, and relay STA releases relay STB. When relay STB releases, it applies earth as usual to all three circuits, but these earths do not reach the pricing frame owing to the operation of contacts PCH4 (Fig. 3), PCH5 (Fig. 2) and PCH6 (Fig. 1). The only one which is effective is that from STB2 (Fig. 2) which goes through operated contact ODA5 and contact PS1 (Fig. 5) to release the next relay in the 6d. group. The release of this relay releases the SB relay in the normal way, and since the locking circuit over relay OD was through operated contact SB3 (Fig. 7), the relay OD releases. Relay ODA then releases immediately as its only circuit is through operated contact OD2. The release of relay ODA permits at contact ODA3 (Fig. 9) the release of relay STA which allows relay STB to re-operate and also allows the pilot relay PS (Fig. 5) to take up its proper position after the release of one of the 6d. counting relays. When relay PS has taken up its position, relay SB will re-operate and as relays DB and FB are already operated, relay PCH can now release and the remainder of the subtraction will proceed normally.

The carry-down of florins into the 6d. circuit is achieved similarly by the operation of relays OS (Fig. 5) and OSA (Fig. 7) in the 6d. group. However, if it should occur that both relays OS and OD are operated by the same pulse, as would occur for example when deducting 7d. from 2/–d., the contact OS7 and OSA2 (Fig. 7) in the operating circuit for relay ODA prevent this relay from operating until the 6d. circuit has completed its carry-down function. The two functions cannot be allowed to proceed simultaneously as a wrong remainder would result.

When it is desired to fit sales meters to the machine, these are plugged in in place of the strappings. The sales meters count the number of earth pulses passed to the various counting relay groups, but the location of the meter plug-points prevents pulses from the carry-down circuits or the change-giving circuits from effecting the meter readings.

It may appear at first that a meter 1SSM connected from battery to points 5 and 6 on the meter plug would satisfactorily count the number of pulses subtracted from the penny circuit, but the high resistance battery connected to the arm of contact PD1 would lead to sneak circuits which would operate the counting relays, and to prevent this the point is connected to a battery connected meter, while the point 6 is connected to an earth contact of that meter or to a contact of a relay which is connected to point 5 in parallel with the meter or with a separate contact to operate the meter.

As the operations involved in subtraction are the most complicated in the entire operation of the equipment, failures are more likely to occur during subtraction than at other times. Since the relays in the subtraction circuit are interlocked with one another and do not rely on time for their sequence of operations, the results of a fault during the subtracting cycle will almost certainly result in the machine locking up rather than completing its cycle incorrectly, and thus in the event of a fault we can expect the SUB relay to remain operated.

For this reason, provision is made for the fitting of a "Sub Check" lamp SCL (Fig. 9) operated from contact SUB7 of the SUB relay, and this lamp will normally light for a few seconds only during the subtracting or change-giving. If it is found to be lighted continuously, then the fault exists in the subtracting circuit and until the maintenance man is available it is possible to resort to restricted working by removing the normal meter plug strappings 1, 2, 3, 4, in Fig. 1, and strapping only points 3 and 4. This permits the machine to be operated for any articles, provided that the exact amount of money is inserted for each article, and thus subtracting and change-giving are not required as the credit relays can simply be released as they normally are when relay CXR is operated.

*Change-giving.*—The circuits are designed to be used in conjunction with a change-maker in which pennies and sixpences are stored, and ejected one at a time by the operation of solenoids. The change storage tubes are fitted with switches DMT and SMT (Fig. 8) which establish operating circuits when coins are available for making change, and which may also be used for lighting a "Change Empty" lamp CEL when either column runs out of coins. The change-maker is an optional fitting and if it is not equipped, no alteration need be made to the circuits, as in the absence of the change-empty switches, the change relays will not function.

Change is returned to the customer on pressing a "Change and Coin Return" button, but change will only be returned if an article has been sold and the AS relay has been operated. This relay operates whenever an article is sold, as described before, and does not release until the credit has been reduced to zero. Thus if no article has been sold since the customer put in his money, he will not receive change but will have his money returned to him. This feature is provided to prevent the machine being used solely as a change-maker, and also to prevent people trying the machine with slugs so that they could get back real money rather than goods in place of a slug. It also prevents the change supply from being unnecessarily depleted, since a person could put in, say, florins and by pressing the change button get out a whole stack of sixpences.

Three relays are used in the change-maker circuit in addition to those normally used during subtracting. When the change button CCR (Fig. 9) is pressed, earth is applied through contact LP8 (which ensures that the change button is ineffective while an article is being delivered) and operated contact AS4 to relay CHP.

The CHP relay prepares a locking circuit for itself at operated contact CHP1 which will be completed when relay contacts CHD6 or CHS6 are closed. Operated contact CHP2 (Fig. 8) completes a circuit for the pennies change relay CHD from earth at the pennies column empty switch DMT through operated contacts 1D7 and CHP2. Thus to operate the CHD relay pennies must be available in the column and the 1D relay must have been operated to indicate that at least one penny is required in change. Similarly, the six-penny change relay CHS is operated from earth at the sixpenny column empty switch SMT through operated contact 1S7 or 1F7, and contact CHP3. In this case a check is made whether sixpences are available and whether at least either one sixpence or a florin is recorded in the counting relays.

Operated contacts CHD6 or CHS6 (Fig. 9) will now operate the relays SUB, SUD, SUS, SUF and STA which are the relays controlling the subtracting function, but in addition certain changes are made to the subtracting circuits. In the case of the pennies circuit, if pennies are required to be given in change, the operated contact CHD3 (Fig. 1) will by-pass the normal subtraction circuit through the pricing frame and this will pass the earth pulses from contact STB3 direct to the pennies counting relays. If change is required in sixpences but not in pennies, then the contact CHD3 and operated contact CHS4 will steer these earth pulses directly to the HDD relay. In the sixpenny circuit, a similar arrangement exists with the contacts CHS3 and CHD4 (Fig. 2) so that sixpences may be deducted while they are required for change, but if the CHS relay is released, the pulses from contact STB4 (Fig. 3) are always steered direct to relay HDF through operated contact CHP5.

During the change-giving function, the article selection keys K1, K2 (Fig. 10) are disabled by the operation of the contact CHP4 and the coin collecting solenoid CC (Fig. 7) is operated over operated contact CHP6 and key DK3. Since relay STA has operated, the normal sequence of operation for change-giving will proceed except that contacts of CHS and CHD relays are used instead of passing the earth pulses through the pricing frame. As each earth pulse is passed to the counting relays, a similar pulse is applied to the change solenoids CMD and CMS (Fig. 7) through contacts CHD2 and CHS2 respectively and contacts PCH2 and STB5, for ejecting the appropriate coins. Subtracting will proceed until, in the case of the pennies, the 1D relay is released. When this occurs, the contact 1D7 (Fig. 8) will break the operated circuit for the relay CHD. However, this relay will remain operated over its contact CHD1 until the relays DB, SB and FB have all released.

This locking circuit ensures that the final pulse to the solenoid is of the full length, as in the absence of this circuit this final pulse would be clipped off short.

Figure 5:
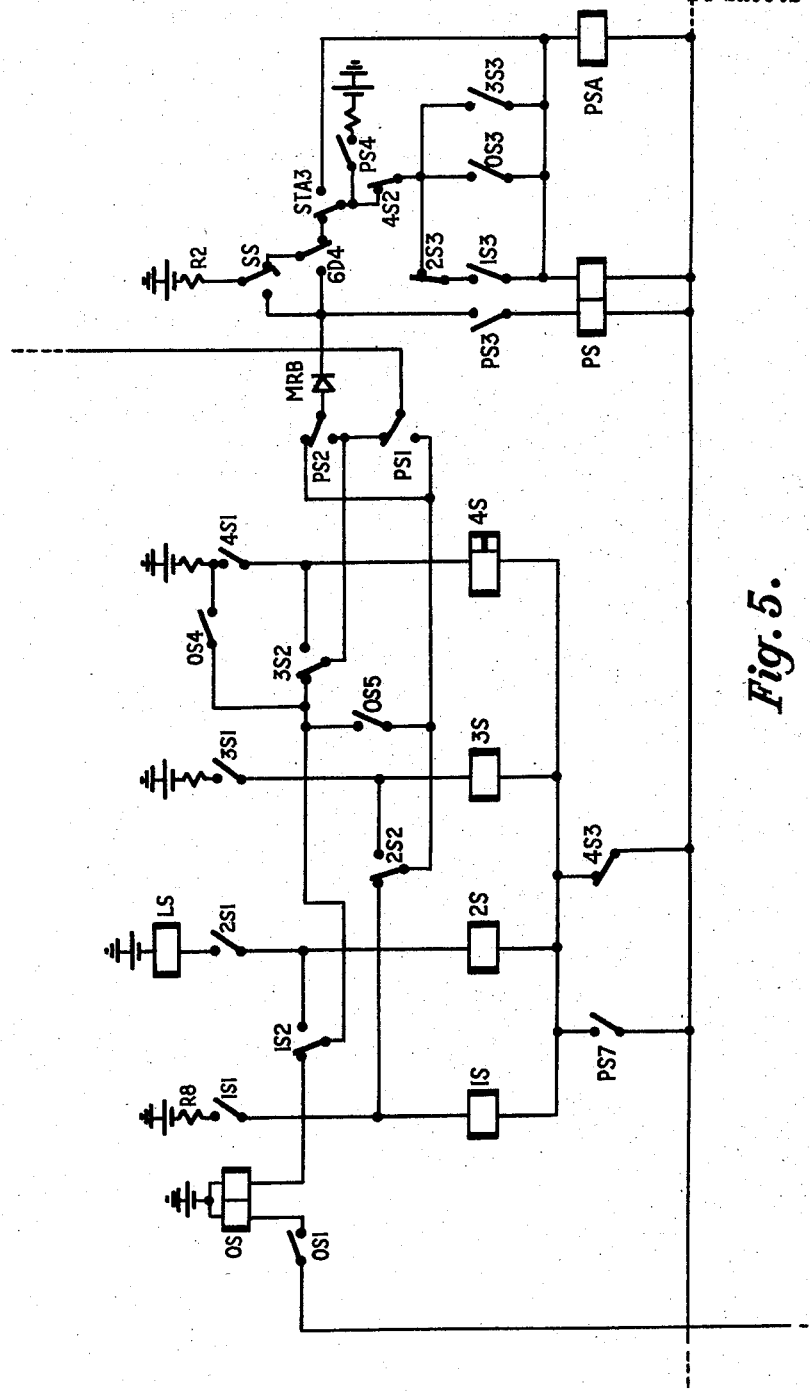

In the case of the sixpences, when the 1S relay has been released, the CHS relay will not be released if there are still florins in the credit, but the next pulse will operate the OS relay (Fig. 5). A florin will be carried down in the usual way but during this carry-down cycle, operated contact PCH2 (Fig. 7) will prevent the operation of the change solenoids so that no extra coins will be ejected.

When both relays CHD and CHS have released, due to the credit having returned to zero, the contacts CHD6 and CHS6 (Fig. 9) will release relay CHP, and also relays SUB, SUD, SUS, SUF, and STA, thus restoring the circuits to normal.

Whenever relay CHD or CHS operates, operated contact CHD5 or CHS5 (Fig. 9) will break the circuit to relay AS and this relay will release and will remain released as its locking circuit is broken at contact AS2.

The circuit for relay RR (Fig. 9) is broken at operated contact CHP7 so that this relay cannot operate during the change-making operation if the change button CCR is pressed a second time.

During the change-giving, the "Sub Check" lamp SCL will be operated over contact SUB7 as it was during the subtracting cycle, so that the continuous operation of this lamp will indicate a failure during the change-giving cycle and restricted working may be adopted, as previously mentioned.

The CC solenoid (Fig. 7) operates during the change-making to ensure that any coins that have been inserted in the machine since the last article was purchased will be collected, otherwise it would be possible for a person to wait until the change had been returned and then obtain these coins by pressing the change button again and releasing the CR solenoid.

*Time delay and motor control circuits.*—Time delays are required in the machine for several purposes. A short time delay provided by the three normally operated slow-releasing relays FRA, FRB and FRC controls the time of operation of the CC and CR solenoids and allows time for the releasing of relays at the end of a vending cycle; but a long time delay is required for releasing the clutch if an article is found to be out of stock, and for stopping the take-off motor some time after the article has been released. The train of relays 1C—5C is used for both these purposes, and in addition this train of relays is used for controlling the amounts to be deducted during the subtracting cycle and it also comes into use during the change-making operation.

It is possible that before an article is selected, the take-off motor may still be running to deliver the article previously selected, and in this case one or more of the relays 1C—5C may be operated. As soon as the line pilot relay LP operates, operated contact LP7 (Fig. 10) removes the locking circuit from these relays so that they will be released and only when they have released, is battery applied to the trip relay TR, through the chain of contacts associated with COK3 (Fig. 9). Thus the time delay is re-set so that when the clutch operates the full amount of time delay is available before an "Out of Stock" signal is given.

If the motor had not been running, it would be started by the operation of relay MR (Fig. 1) when relay COK was operated, and operated contact MR4 (Fig. 7) completes the circuit for the periodic operation of relay PCH from earth at the time contact TD, which is driven from the take-off motor, through contact SUB6 and operated contact MR4. These operations of relay PCH will cause pulses to be applied to the relay train 1C—5C (Fig. 10) through operated contact PCH3 and while the clutch is operated, these relays will lock over operated contact TR7.

If the article has not been delivered by the time the 4C relay is operated, then the clutch will be released owing to the operation of contact 4C7: the motor will still run and when relay 5C operates, the circuits will be cleared down due to the operation of contact 5C7 (Fig. 9) which releases relay FRA and the motor will be stopped due to the operation of contact 5C6 (Fig. 1). The "Bin-Empty" indicator MT1 (Fig. 10) will operate over operated contacts TR3, 5C5 and 1LR4. If the article is properly delivered, it will operate the trip switch and release the relay TR and the locking circuit for relays 1C—5C will be removed by the release of contact TR7. If subtracting is to be effected, relay SUB (Fig. 9) will not operate until the contacts in the chain associated with contact COK3 have all restored, thus indicating that all five relays are released to the correct position to start a subtracting cycle. Relay SUB will apply a locking earth to the train 1C—5C again over its operated contact SUB5 (Fig. 10).

The relay MR operates over contact MR2 (Fig. 10), a relay TMC for starting over contact TMC1 the take-off motor TOM, but another relay CMC is provided for starting the clutch motor CM over contact CMC1, and this motor runs only as long as the clutch circuit is closed.

*Cash and sales meters.*—The circuit provides for cash meters to be plugged in when required, but the number of coins inserted cannot be taken as an indication as coins may be returned to the customer after having been counted. The alternative method of counting the value of goods sold is to count the number of pulses applied to the counting circuits during subtraction. Thus, if a person buys a 5d. article the insertion of five pennies is not counted, but the application of five subtracting pulses to the penny counting relays is counted. However, in using this method false readings could occur if the normal circuit were used in which the CXR relay simply releases the counting relays in some cases instead of going through the complete subtracting cycle. To avoid this, the strappings on points 1–4 of the meter plug MP (Fig. 1) are re-arranged when cash meters are used, so that the relay CXR is never operated and the subtracting cycle is carried out for all articles.

The difficulty that arises when cutting out the CXR relay is that the circuit relies on operation of this relay for releasing the relay AS when the credit returns to zero. An alternative method of releasing the relay AS must be provided and to do this the extra relay CZR (Fig. 1) is included with the set of cash meters plugged into the machine, and this CZR relay operates to an earth applied to point 3 of the meter plug when the credit is exactly right. Its contact CZR1 then extends this earth to relay COK through point 1 of the meter plugs, and its contacts CZR2 and CZR3 break the circuits between points 11—12 and 13—14 (Fig. 9) as mentioned above. These points are normally strapped across when the meter plug is not being used and when they are disconnected by the operation of the CZR relay, the locking circuit over relay AS is only applied through contact SUB3 in its unoperated position. Thus as soon as the machine starts to subtract, after an article has been selected whose price is exactly equal to the credit, the contact SUB3 will release relay AS so that it is restored ready for the next customer.

A "Total Sales" meter TSM (Fig. 10) is supplied to record the number of articles sold. This meter operates after each sale from earth over contact TR3 and operated contact COK7. The same earth is also extended through contacts 1LR5 of the line relays to an individual sales meter 1SM for counting the number of articles sold from the corresponding line.

*Substitution of relay boxes.*—All five relay boxes are different and if a fault should occur in either the "M," "C," or "D" box it is necessary to replace it by another box of the same designation. However, the "S" and "F" boxes may be replaced by a "D" box if the correct box is unavailable, and the machine will then operate in all respects as if the boxes were in their correct place.

This means that the maintenance man need only be supplied with "M," "C" and "D" boxes to be able to replace any box on the machine. It should be noted that replacing either the "S" or "F" boxes by a "D" box, or even using three "D" boxes in the counting positions, does not restrict the facilities offered by the machine in any way and the necessary connections to modify the circuits of the "D" box are automatically made when that box is plugged into each position.

In Fig. 13 the arrangement of the various relay boxes is shown. To facilitate finding the various relays in the circuit schematic the figure in which each relay appears in the circuit diagram is shown adjacent to the relay marking in each box.

It can be seen that the "D" box contains a greater number of relays than the "S" or "F" box and thus the "D" box has enough relays to fulfill the functions of the "S" or "F" box as the case may be, particularly as the relays in the three boxes are used for similar functions in the three denominations i.e. pennies, sixpence and florins.

*Restricted working.*—In the event of a circuit failure, the particular box in which the fault occurs may be replaced or all boxes may be replaced and taken away in order to locate the fault. It may often happen that a maintenance man is not immediately available, or that it is undesirable to switch the machine off even for a short period, to effect replacement of boxes. There are several ways in which the machine may be used with restricted facilities, although failure has occurred in some part of the circuit. Owing to the complication of the operations in the subtracting and change-giving circuits, it s probable that failures will occur most often during these operations and owing to the circuit arrangements it is most probable that the SUB relay will remain operated and lock the machine up in the event of such a fault. A red light may be provided, preferably adjacent to the meter plug, as mentioned above, which normally lights only when the SUB relay is operated. This "Sub Check" lamp SCL (Fig. 9) is operated over contact SUB7. If this lamp is found to be lighted continuously, indicating a failure in the subtracting circuit, it is only necessary to switch off the machine, to pull out the normal plug from the meter socket and to insert in this socket a "Restricted Working" plug which should be provided with every machine. This plug provides that the circuit to COK relay (Fig. 1) can only be completed if the CXR relay is operated to indicate that the credit is exactly right, and in this way ensures that the subtracting and change-giving cycles are not brought into operation. All that is then necessary is to hang on the machine a notice saying "Use Exact Money for Each Article" and the machine can be switched on and will carry on selling goods until some more attention can be given to it.

In this condition, if a customer should insert more credit than he needs to buy an article, the machine will behave exactly as though he had put in too little money and will return his coins and cancel his credit.

It should be noted that in this restricted working position there is no need to provide for operation of relay AS, as there can never be any credit left in the machine after a transaction.

*Two-box working.*—While the restricted working mentioned above provides for many types of circuit failure, it may happen that one of the counting boxes fails and cannot be immediately replaced, even by the substitution of a "D" box in its place. If any of the three counting boxes breaks down it can be removed and the machine operated with only two boxes in place, and a dummy plug in place of the third box.

Naturally the facilities offered by the machine must be restricted in some way by this form of operation, but whichever two boxes remain serviceable, may be arranged so that the machine will sell articles with prices up to 1/11d. in steps of a penny, or in the case of a machine which handles more expensive articles, the machine may be left working so that it will sell articles priced at up to 11/6d. provided that the prices are in multiples of 6d. Both alternatives are available using any two boxes.

*Operation with no "F" box, using prices up to 1/11d.*— In this case, the "F" box is simply replaced by a dummy plug and the machine will accept coins up to a maximum of 1/11d. and if more money than this is inserted, the RR relay (Fig. 9) will be operated over a circuit from battery through the florin switch FS (Fig. 6), through operated contact 4S4 and through a strapping of the dummy plug between jack points F10 and F30 to relay RR. Insertion of a florin would have the same effect, although preferably the florin slot should be blocked.

The dummy plug has a strap between points F40 and F20 (Fig. 3) so that when a selected article has no florin in its price, the earth from the zero bar of the florin section will be extended to the sixpenny section and operation, including subtraction, will proceed normally. No circuit is available for articles with prices which include florins.

In this condition the pennies lamps will operate normally, but the 1/–d. lamp will not light.

*Operation with no "S" box, using prices up to 1/11d.*— In this case the faulty "S" box is removed and replaced by the "F" box and the dummy plug is inserted in the "F" position. In this case operation proceeds as above and subtracting may be used if several articles are required, but the strap between points F29 and F28 (Fig. 6) is broken so that relays 4F and 5F do not come into operation, and so this box will now count only three sixpences. A fourth pulse would be passed to point F29 ("F" box in "S" position) which is strapped through the dummy plug to F30 and thence will operate relay RR and return coins.

*Operation with no "D" box, using prices up to 1/11d.*— The faulty "D" box is removed and replaced by the "F" box, which in turn is replaced by a dummy plug. This condition is rather more restricted since, although the "F" box will add up pence when used in the "D" position, it will not carry them forward into the sixpenny denomination, nor can it carry down a sixpence, so we are restricted to using the CXR condition for delivery and operating only if not more than five pennies are inserted at a time.

If more than five pennies are inserted, the customer will have the cash lamps to guide him that he is being given no more credit, but even if he does not see this, his attempt to buy, say, a 7d. article for seven pennies, will result in his money being returned to him so that he does not lose by it.

With the "F" box in the "D" position there is no connection to point D6 (Fig. 1) and therefore there is no circuit for the direct operation of relay COK, but COK can still be operated provided relay CXR operates first. Since the dummy plug is in the "F" position, a fourth pulse in the sixpence circuits will result in operation of relay RR over the operated contact 4S4. It will be noted that in the three methods of working described above, the dummy plug is always used in the "F" position.

*Operation with no "D" box, using prices by sixpences to 11/6d.*—The faulty "D" box is removed and replaced by the dummy plug. As there is nothing to count pennies, the penny slot should be blocked. Sixpences and florins will be counted by their usual circuits, although there will be no lamp lighted to indicate the credit of 6d.

In this case the CXR condition only may be used, so that coins inserted must equal the price of the article. The florin and sixpenny section of the pricing frame operate normally, but as the dummy plug is not strapped between points D6 and D7 (Fig. 1) there is no direct circuit to relay COK, but if credit in sixpences and florins is exactly right, and provided the pence section has a screw in the zero position, the earth will be extended from the zero pence bar through points D40 and D20, which are strapped on the dummy plug to relay CXR.

*Operation with no "S" box, using prices by sixpences to 11/6d.*—In this case the faulty "S" box is replaced by the "D" box and the dummy plug is inserted into the "D" position.

Operation proceeds exactly as described in the previous case, since the "D" box is a complete replacement for the "D" faulty "S" box.

*Operation with no "F" box, using prices by sixpences to 11/6d.*—In this case the faulty "F" box is removed and replaced by the "D" box. The dummy plug is used in the "D" position and again operation is exactly as described above since the "D" box is a complete replacement for an "F" box.

*Loading.*—When it is desired to re-load any of the storage belts of the machine, a loading bar is moved across the releasing end of the belt and the loading bar switch is operated, which operates the contacts LBS1 and LBS2 (Fig. 10). Operated contact LBS1 applies battery to the CMC contactor through contact 4C7, and operated contact LBS2 prepares the circuit to any of the clutches CL1, CL2 from battery at contact 4C7 which can be completed by inserting a loading plug in any of the loading jacks LJ1, LJ2, etc. The loading plug connects together the two contacts of the jack into which it is inserted and the appropriate clutch operates in series with a coil of the bin-empty indicator MT1, MT2, etc. Thus the clutch moves the belt forward so that articles placed on it will be moved into position and as the polarity of the coil of the bin-empty indicator is opposite to that of the coil in circuit with contact 1LR4, 2LR4, etc. the flag of the bin-empty indicator will be returned to its normal position, indicating that articles are again available from that line and permitting the price of the articles to be seen.

*Disabling key.*—To facilitate the checking of the machine with regard to the adding and subtracting cycle, a disabling key with contacts DK1 to DK6 is provided which is manually operated and disables the release mechanism so that no articles will be released on the operation of the machine.

When a check is to be made, the money is put in and the machine indicates in normal manner the established credit. On pressing one of the selector buttons, however, no article can be released, as the circuit for the clutches CL1 (Fig. 10) is interrupted at operated contact DK2 of the disabling key. This contact breaks also the circuit for the individual sales meters 1SM . . . and the total sales meter TSM, as no article is released.

As normally the trip contact TC1 . . . is interrupted by a released article to start the subtracting cycle, this interruption has to be replaced on checking by another break in the circuit. For this purpose contact DK1 is used. On operation of the disabling key the direct battery connection is removed from the locking circuit of relay TR and the battery is now supplied from the relay train 1C to 5C over contacts 5C4 (Fig. 9), 4C6, 3C7 and 2C7, so that on operation of relay 2C the circuit over the trip contact is interrupted and the subtracting cycle starts in the usual manner.

As no article is delivered, the coins used for checking the machine should be refunded. Thus the coin collecting solenoid CC (Fig. 7) is disabled at contact DK3 and the money can be recovered by the operation of the coin return button CCR (Fig. 9).

The contacts DK4 (Fig. 1), DK5 (Fig. 2) and DK6 (Fig. 3) do not fulfill any useful function unless cash meters are plugged in at the points 5—6, 7—8, and 9—10. As the inserted money is returned during checking of the adding and subtracting cycle, no indication should be given to the cash meters. Thus the above-mentioned contacts of the disabling key break the cash meter circuits and provide a through connection as in operation without cash meters.

*Multiple bins.*—For articles in great demand it may be advantageous to store these articles on more than one storage belt, and to provide means whereby the operation of one button releases these articles alternately from the two belts. A circuit arrangement to fulfill this requirement is shown in Fig. 12. The multiple arrangement is shown for the first two lines of Fig. 10 and thus the various parts which are identical in the two figures are marked with the same reference letters. It can be seen that only two additional relays LRA and LRB are required. On the other hand the key K2, the "bin-empty" indicator MT2 and the sales meter 2SM can be dispensed with.

On the first operation of key K1 the line relay 1LR operates in the usual manner and the circuit to clutch CL1 is completed over contact 1LR3 (operated) and contact LRA4. At the same time the circuit to trip contact TC1 is closed over contact 1LR2 operated and contact LRA5 so that the release of an article and all the other functions of the machine proceed in the manner described earlier. When battery is applied to the clutch over contacts COK2 and TR2 relay LRB is operated and closes a locking circuit for itself over its second winding and contact LRB1. This relay connects at contact LRB2 the key K1 with the auxiliary line relay LRA. When key K1 is operated again relay LRA operates, establishes a locking circuit over its second winding at contact LRA1 and at contact LRA2 connects the key K1 also with the line relay 1LR which now operates also in the usual way. Contacts LRA5 and LRA4 switch the connections from trip contact TC1 and clutch CL1 respectively to trip contact TC2 and clutch CL2, so that now an article from the second line is released. Operated contact LRA3 connects the battery at clutch CL2 (coming from contacts COK2, TR2 and 1LR3) to the second winding of relay LRB, so that relay LRB is now short circuited and releases. Relay LRA remains operated during the cycle of operations over its second winding but is released when contact FRC1 opens. Thus the whole circuit is again in its initial condition, so that the next selected article is again released from the first line. In this way articles are delivered alternately from the two lines and the change-over from one to the other is only effected when an article is actually delivered. Ineffective operation of the button (for example, when another button is already pressed) does not change over the circuit so that there is no possibility that one line sells more articles than the other. As long as both lines are loaded evenly one "bin-empty" indicator MT1 is sufficient to indicate when the stock on both lines is exhausted.

I claim:

1. Apparatus for vending articles having dispensing devices to store and dispense one or a plurality of selected articles of various character; value recording means presettable in accordance with the value of each article to be dispensed; a coin-operated device adapted to accept a plurality of coins of the same or various denominations and including credit-registering means operable by said coins; article selecting means to select articles for dispensing; first checking means to check the pre-set values of selected articles against the registered credit and releasing means operable by said first checking means to initiate the release of selected articles only when the registered credit is greater than the pre-set value of a selected article; subtracting means operable at the release of said selected article to reduce the credit registered at said credit-registering means by the pre-set value of said selected article; second checking means to check the pre-set values of selected articles against the registered credit and to operate said releasing means to initiate the release of selected articles only when the registered credit is exactly equal to the pre-set value of a selected article, and cancelling means operable by said second checking means at the release of said selected article to cancel the registered credit.

2. Apparatus for vending articles as claimed in claim 1 in which said credit registering means includes relays operable in sequence by successfully tendered coins, and means to release said relays in reverse sequence in accordance with the pre-set value of a released article to reduce said credit.

3. Apparatus for vending articles as claimed in claim 1 and including switching means to disable said first checking means in case of failure of said subtracting means.

4. Apparatus for vending articles as claimed in claim 1 and having electrically operable change giving means and manually operable contact means to set said change giving means in motion, electrical connections from said change giving means to said subtracting means to operate said subtracting means, and further electrical connections from said change giving means to said credit-registering means and operable thereby, said change giving means being de-energised when said credit-registering means are returned to zero.

5. Apparatus for vending articles having dispensing devices to store and dispense one or a plurality of selected articles of various character; value recording means pre-settable in accordance with the value of each article to be dispensed; a coin operated device adapted to accept a plurality of coins of the same or various denominations and including credit registering means operable by said coins; said credit registering means comprising for each of said denominations a relay unit having relays operable in sequence to add up the values of coins received in that denomination and first transfer means to carry forward amounts exceeding one denomination into the next higher denomination; article selecting means to select articles for dispensing; checking means to check the pre-set values of selected articles against the registered credit and to initiate the release of selected articles when the registered credit is at least equal to the pre-set value of a selected article; subtracting means operable at the release of said selected article to reduce the registered credit by releasing the relays in each unit in reverse sequence in accordance with the pre-set value of said released article; and second transfer means to carry down an amount from a higher denomination to the next lower denomination, when the credit indicated by the relay unit for said lower denomination passes through zero.

6. Apparatus for vending articles having dispensing devices to store and dispense one or a plurality of selected articles of various character; value recording means pre-settable in accordance with the value of each article to be dispensed; a coin operated device adapted to accept a plurality of coins of the same or various denominations and including credit registering means operable by said coins; said credit registering means comprising for each of said denominations a relay unit having relays operable in sequence to add up the values of coins received in that denomination and first transfer means to carry forward amounts exceeding one denomination into the next higher denomination; article selecting means to select articles for dispensing; checking means to check the pre-set values of selected articles against the registered credit and to initiate the release of selected articles when the registered credit is at least equal to the pre-set value of a selected article; subtracting means operable at the release of said selected article to reduce the registered credit by releasing the relays in each unit in reverse sequence in accordance with the pre-set value of said released article; a value counting device included in each of said relay units and operable by said subtracting means to indicate for each denomination the total value of released articles; and second transfer means to carry down an amount from a higher denomination to the next lower denomination, when the credit indicated by the relay unit for said lower denomination passes through zero.

7. Apparatus for vending articles having dispensing devices to store and dispense one or a plurality of selected articles of various character; value recording means pre-settable in accordance with the value of each article to be dispensed; a coin operated device adapted to accept a plurality of coins of the same and various denominations and including credit-registering means operable by said coins; article selecting means to select articles for dispensing from said dispensing devices; coin holding means to temporarily hold said accepted coins and including electrically operable coin collecting means and coin return means; checking means to check the pre-set values of selected articles against the registered credit; releasing means operable by said checking means to initiate the release of a selected article when the registered credit is at least equal to said pre-set value of said article; release detecting means operable by each released article; subtracting means operable by said release detecting means to reduce the credit registered at said credit-registering means by said pre-set value of said selected article; electrical connections from said coin collecting means to said release detecting means; further electrical connections from said coin return means to said selecting means, said releasing means, said release detecting means and said credit-registering means; cancelling means electrically connected with said credit-registering means to cancel any credit registered thereby, and a return control relay electrically connected with and energized by said release detecting means when said credit-registering means maintain a credit, said return control relay having contacts interposed in the electrical circuits of said coin return means and said cancelling means to disable said circuits upon the operation of said return control relay, and a locking circuit for said return control relay, said locking circuit being controlled by said credit-registering means to release said return control relay when said credit registering means are returned to zero.

8. Apparatus for vending articles as claimed in claim 7 and having a timing device included in said electrical connection from said coin return means to said selecting means and said releasing means and being operable by said selecting means to operate said coin return means upon non-operation of said releasing means within a predetermined time; and electrical connections from said timing device to said cancelling means to operate said cancelling means for the cancellation of any credit registered by said credit-registering means.

9. Apparatus for vending articles as claimed in claim 7 and having a timing device included in said electrical connection from said coin return means to said selecting means and said release detecting means and being operable by said selecting means to operate said coin return means upon non-operation of said release detecting means within a predetermined time, and electrical connections from said timing device to said cancelling means to operate said cancelling means for the cancellation of any credit registered by said credit registering means.

10. Apparatus for vending articles as claimed in claim 7 and including relay means in said credit-registering means operable by coins tendered to said coin-operated device beyond the accumulated capacity of said credit-registering means, said relay means operating said coin return means; electrical connections from said relay means to said cancelling means to operate said cancelling means for the cancellation of any credit registered by said credit-registering means, and a contact of said return control relay interposed in the operating circuit of said relay means to disable said relay means upon operation of said return control relay.

11. Apparatus for vending articles as claimed in claim 7 and including electrically operable change giving means, and manually operable contact means to set said change giving means and said coin return means in motion; electrical connections from said manually operable contact means to said change giving means and said coin return means, and contacts of said return control relay interposed in said electrical connections to close the connection to said coin return means when said return control relay is de-energised and to close the connection to said change giving means when said return control relay is energised; and further electrical connections from said change giving means to said subtracting means and said credit-registering means, said change giving means operating said subtracting means, being kept in operation by said credit-registering means, and being de-energised when said credit-registering means are returned to zero.

References Cited in the file of this patent

UNITED STATES PATENTS

| | | |
|---|---|---|
| 2,323,255 | Sutherland | June 29, 1943 |
| 2,354,896 | Weiler | Aug. 1, 1944 |
| 2,389,327 | Rockola et al. | Nov. 20, 1945 |
| 2,531,238 | Tandler et al. | Nov. 21, 1950 |
| 2,623,621 | Armor et al. | Dec. 30, 1952 |
| 2,659,471 | Johnston | Nov. 17, 1953 |
| 2,663,398 | Skillman | Dec. 22, 1953 |
| 2,708,996 | Skillman | May 24, 1955 |
| 2,732,054 | Hehn | Jan. 24, 1956 |

FOREIGN PATENTS

| | | |
|---|---|---|
| 198,135 | Great Britain | May 31, 1923 |
| 216,304 | Great Britain | May 29, 1924 |
| 669,285 | Great Britain | Apr. 2, 1952 |

UNITED STATES PATENT OFFICE

CERTIFICATE OF CORRECTION

Patent No. 2,895,583                                            July 21, 1959

Alan D. Lackey

It is hereby certified that error appears in the printed specification of the above numbered patent requiring correction and that the said Letters Patent should read as corrected below.

Column 2, line 63, for "rejected" read -- reject --; column 15, line 66, for "puses" read -- pulses --; column 17, line 30, for "svwitch" read -- switch --; column 19, line 46, after "point" insert -- 5 --; column 22, line 64, for "plugs" read -- plug --; column 25, line 20, before "faulty", strike out ' "D" '.

Signed and sealed this 15th day of December 1959.

(SEAL)

Attest:

KARL H. AXLINE
Attesting Officer

ROBERT C. WATSON
Commissioner of Patents